US010866957B2

(12) United States Patent
Suzuki et al.

(10) Patent No.: US 10,866,957 B2
(45) Date of Patent: Dec. 15, 2020

(54) INFORMATION PROVIDING DEVICE, INFORMATION PROVIDING METHOD, AND STORAGE MEDIUM, FOR PROVIDING INFORMATION OF USER GROUP

(71) Applicant: JVC KENWOOD Corporation, Yokohama-shi (JP)

(72) Inventors: Kenta Suzuki, Yokohama (JP); Ichiro Shishido, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 295 days.

(21) Appl. No.: 15/908,848

(22) Filed: Mar. 1, 2018

(65) Prior Publication Data

US 2018/0189295 A1 Jul. 5, 2018

Related U.S. Application Data

(63) Continuation of application No. PCT/JP2016/066184, filed on Jun. 1, 2016.

(30) Foreign Application Priority Data

Sep. 1, 2015 (JP) .................................. 2015-171762
Sep. 1, 2015 (JP) .................................. 2015-171763

(51) Int. Cl.
*G06F 16/2457* (2019.01)
*G06F 16/00* (2019.01)
*G06Q 30/02* (2012.01)
*G06Q 50/00* (2012.01)
*G06Q 30/06* (2012.01)
*G01C 21/36* (2006.01)
(Continued)

(52) U.S. Cl.
CPC ... *G06F 16/24578* (2019.01); *G01C 21/3679* (2013.01); *G06F 16/00* (2019.01);
(Continued)

(58) Field of Classification Search
CPC .... G06F 16/2379; G06F 16/29; G06F 16/285; G06F 16/00; G06F 16/1734; G06F 16/212; G06F 16/219; G06F 16/2228
(Continued)

(56) References Cited

U.S. PATENT DOCUMENTS

2010/0268661 A1* 10/2010 Levy ...................... G06Q 30/02
705/347
2012/0290950 A1* 11/2012 Rapaport ................ H04L 51/32
715/753
(Continued)

FOREIGN PATENT DOCUMENTS

| JP | 2004320217 A | 11/2004 |
|----|--------------|---------|
| JP | 2005300965 A | 10/2005 |
| JP | 2008210363 A | 9/2008 |
| JP | 2009210400 A | 9/2009 |
| JP | 2013182533 A | 9/2013 |
| JP | 2014006742 A | 1/2014 |
| JP | 201467306 A | 4/2014 |
| JP | 2015133033 A | 7/2015 |

*Primary Examiner* — Angelica Ruiz

(74) *Attorney, Agent, or Firm* — Brundidge & Stanger, P.C.

(57) ABSTRACT

A group forming unit acquires position information of a subject that is a user or a terminal device, and forms a group including a plurality of subjects on the basis of time series data of the position information pertaining to the plurality of subjects. A point calculator calculates, on the basis of the time series data of the position information, a characteristic action amount indicating the degree of being matched with a predetermined action pattern in which influence of a subject in the group is high, for each of the plurality of subjects included in the group formed in the group forming unit, and calculates a point for each of the subjects on the basis of the characteristic action amount. An item selector selects an item to be presented to the group such that a subject having a high point calculated in the point calculator is prioritized.

20 Claims, 29 Drawing Sheets

(51) Int. Cl.
  *H04W 4/021*     (2018.01)
  *H04W 4/02*      (2018.01)
  *G06F 16/9537*   (2019.01)
(52) U.S. Cl.
  CPC ..... *G06Q 30/0251* (2013.01); *G06Q 30/0255* (2013.01); *G06Q 30/0261* (2013.01); *G06Q 30/0631* (2013.01); *G06Q 50/01* (2013.01); *H04W 4/021* (2013.01); *H04W 4/025* (2013.01); *G06F 16/9537* (2019.01)
(58) Field of Classification Search
  USPC .......... 707/600–831, 899, 999.001–999.206
  See application file for complete search history.

(56) References Cited

U.S. PATENT DOCUMENTS

| | | | | |
|---|---|---|---|---|
| 2012/0322549 | A1* | 12/2012 | Kim | G06Q 50/01 463/29 |
| 2013/0018957 | A1* | 1/2013 | Parnaby | G06Q 10/10 709/204 |
| 2014/0280226 | A1* | 9/2014 | Wilson | G06N 3/063 707/748 |
| 2014/0344718 | A1* | 11/2014 | Rapaport | H04L 51/32 715/753 |
| 2016/0290824 | A1* | 10/2016 | Tagami | G01C 21/3691 |
| 2018/0189295 | A1* | 7/2018 | Suzuki | G06Q 30/0261 |

* cited by examiner

FIG.4

| DATE AND TIME | TERMINAL ID | LATITUDE | LONGITUDE |
|---|---|---|---|
| 2015/3/20 10:11:25 | A | 48.51012 | 2.22023 |
| 2015/3/20 10:11:55 | A | 48.51018 | 2.22025 |
| 2015/3/20 10:11:26 | B | 48.51011 | 2.22024 |
| 2015/3/20 10:11:55 | B | 48.51012 | 2.22025 |
| 2015/3/20 10:11:20 | C | 48.51015 | 2.22023 |
| ... | ... | ... | ... |
| 2015/3/20 10:11:53 | C | 48.51018 | 2.22025 |
| ⋮ | | | |

|   | A  | B  | C  | D  | E  | F  | G  |
|---|----|----|----|----|----|----|----|
| A |    |    |    |    |    |    |    |
| B | 1  |    |    |    |    |    |    |
| C | 3  | 2  |    |    |    |    |    |
| D | 5  | 4  | 7  |    |    |    |    |
| E | 6  | 8  | 7  | 2  |    |    |    |
| F | 20 | 25 | 30 | 28 | 22 |    |    |
| G | 21 | 27 | 28 | 30 | 23 | 2  |    |
| H | 50 | 52 | 54 | 55 | 57 | 47 | 48 |

| GROUP ID | TERMINAL ID | LEADER POINT (Rp) |
|---|---|---|
| G1 | A | 20 |
| G1 | B | 50 |
| G1 | C | 30 |
| G2 | A | 0 |
| G2 | C | 0 |
| G2 | F | 0 |
| G2 | G | 0 |
| ... | ... | ... |

| TERMINAL ID | JAPANESE | FRENCH | ITALIAN | ETHNIC | FAST FOOD | TOTAL |
|---|---|---|---|---|---|---|
| A | 5 | 2 | 0 | 1 | 7 | 15 |
| B | 2 | 7 | 1 | 3 | 2 | 15 |
| C | 2 | 1 | 8 | 2 | 2 | 15 |

| STORE ID | STORE NAME | GENRE | LATITUDE | LONGITUDE | ADDRESS | CONTACT | STORE DESCRIP-TION | EVALUATION POINT |
|---|---|---|---|---|---|---|---|---|
| 0001 | STORE 1 | JAPANESE | 48.45 | 2.335 | ADDRESS 1 | CONTACT 1 | ... | 70/100 |
| 0002 | STORE 2 | FRENCH | 43.21 | 1.133 | ADDRESS 2 | CONTACT 2 | ... | 50/100 |
| 0003 | STORE 3 | ITALIAN | 45.76 | 2.213 | ADDRESS 3 | CONTACT 3 | ... | 85/100 |
| ... | ... | ... | ... | ... | ... | ... | ... | ... |

| RANK | STORE ID | DEGREE OF RECOMMEN-DATION | STORE NAME | STORE DESCRIP-TION | CURRENT AVAILA-BILITY | POSITION INFORMA-TION | ADDRESS | CONTACT | DISTANCE FROM CURRENT POSITION |
|------|----------|---------------------------|------------|--------------------|-----------------------|------------------------|---------|---------|-------------------------------|
| 1 | 0187 | 9.8 | STORE 1 | ... | AVAILABLE FOR ALL GROUP MEMBERS | POSITION 1 | ADDRESS 1 | CONTACT 1 | 100m |
| 2 | 0012 | 8.5 | STORE 2 | ... | AVAILABLE FOR ALL GROUP MEMBERS | POSITION 2 | ADDRESS 2 | CONTACT 2 | 350m |
| 3 | 3821 | 7.2 | STORE 3 | ... | AVAILA-BILITY FOR THREE | POSITION 3 | ADDRESS 3 | CONTACT 3 | 250m |
| ... | ... | ... | ... | ... | ... | ... | ... | ... | ... |

| RANK | RECOMMEN-DATION RANK | STORE NAME | STORE DESCRIP-TION | CURRENT AVAILABILITY | ADDRESS | DISTANCE FROM CURRENT POSITION | | |
|---|---|---|---|---|---|---|---|---|
| \* | RESTAURANT LIST RECOMMENDED FOR GROUP OF FIVE IN ○○ AREA | | | | | | | |
| 1 | ★★★ | STORE 1 | ... | AVAILABLE FOR ALL GROUP MEMBERS | ADDRESS 1 | 100m | DISPLAY MAP | CONTACT |
| 2 | ★★★ | STORE 2 | ... | AVAILABLE FOR ALL GROUP MEMBERS | ADDRESS 2 | 350m | DISPLAY MAP | CONTACT |
| 3 | ★★ | STORE 3 | ... | AVAILABILITY FOR THREE | ADDRESS 3 | 250m | DISPLAY MAP | CONTACT |
| ... | ... | ... | ... | ... | ... | ... | | |

| TERMINAL ID | BIRTH DATE | GENDER | WORK PLACE | POSITION | ANNUAL INCOME (MILLION YEN) | ALLOWANCE OF THIS MONTH (TEN THOUSAND YEN) |
|---|---|---|---|---|---|---|
| A | 1975/7/6 | MALE | X COMPANY | CHIEF | 500 | 3 |
| B | 1979/5/3 | MALE | X COMPANY | GENERAL | 400 | 4 |
| C | 1985/4/12 | FEMALE | X COMPANY | GENERAL | 400 | 5 |
| D | 1970/5/30 | MALE | X COMPANY | GENERAL | 600 | 1 |
| E | 1967/3/2 | FEMALE | Y COMPANY | PRESIDENT | 1000 | 20 |
| F | 1964/10/1 | MALE | Y COMPANY | SECTION CHIEF | 500 | 5 |
| G | 1965/5/20 | FEMALE | Z COMPANY | DEPARTMENT MANAGER | 1500 | 10 |
| H | 1992/3/15 | MALE | Z COMPANY | SECTION CHIEF | 700 | 7 |

| COMPANY NAME | COMPANY ACCEPTING ORDER 1 | COMPANY ACCEPTING ORDER 2 | COMPANY ACCEPTING ORDER ··· |
|---|---|---|---|
| X COMPANY | Y COMPANY | ... | ... |
| Y COMPANY | Z COMPANY | ... | ... |
| ... | ... | ... | ... |

| TERMINAL ID | BIRTH DATE | GENDER | RELATION-SHIP | FAMILY RELATION |
|---|---|---|---|---|
| A | 1972/8/23 | MALE | E FAMILY | FATHER |
| B | 1973/3/15 | FEMALE | E FAMILY | MOTHER |
| C | 1995/12/2 | FEMALE | E FAMILY | DAUGHTER |
| D | 1997/3/2 | MALE | E FAMILY | SON |

| GROUP ID | TERMINAL ID | CALCULATION DATE AND TIME | LEADER POINT | STORE ID | PURPOSE CLASSIFICATION |
|---|---|---|---|---|---|
| G11 | A | 2015/1/1 10:05 | 0.1 | 0001 | JAPANESE RESTAURANT |
| G11 | B | 2015/1/1 10:05 | 0.05 | 0001 | JAPANESE RESTAURANT |
| G11 | C | 2015/1/1 10:05 | 0.4 | 0001 | JAPANESE RESTAURANT |
| G11 | D | 2015/1/1 10:05 | 0.4 | 0001 | JAPANESE RESTAURANT |
| G11 | E | 2015/1/1 10:05 | 0.05 | 0001 | JAPANESE RESTAURANT |
| G12 | A | 2015/1/2 20:10 | 0.2 | 0002 | FRENCH RESTAURANT |
| G12 | C | 2015/1/2 20:10 | 0.6 | 0002 | FRENCH RESTAURANT |
| G12 | E | 2015/1/2 20:10 | 0.15 | 0002 | FRENCH RESTAURANT |
| G12 | H | 2015/1/2 20:10 | 0.05 | 0002 | FRENCH RESTAURANT |
| G13 | A | 2015/1/3 11:30 | 0.2 | 0010 | GENERAL STORE |
| G13 | C | 2015/1/3 11:30 | 0.8 | 0010 | GENERAL STORE |
| G14 | A | 2015/1/3 22:45 | 0.1 | 0031 | BAR |
| G14 | Z | 2015/1/3 22:45 | 0.9 | 0031 | BAR |
| ... | ... | ... | ... | ... | ... |

| NUMBER OF PEOPLE IN GROUP | Rp LARGE | Rp MIDDLE | Rp SMALL |
|---|---|---|---|
| 2 | 0.8 ~ | 0.4 ~ 0.8 | ~ 0.4 |
| 3 | 0.7 ~ | 0.3 ~ 0.7 | ~ 0.3 |
| ... | ... | ... | ... |
| 10 OR MORE | 0.2 ~ | 0.05 ~ 0.2 | ~ 0.05 |

| GROUP ID | TERMINAL ID | LEADER POINT (Rp) |
|---|---|---|
| G1 | A | 20 |
| G1 | B | 50 |
| G1 | C | 30 |
| G2 | A | 150 |
| G2 | C | 80 |
| G2 | F | 20 |
| G2 | G | 40 |
| ... | ... | ... |
| G21 | C | 80 |
| G21 | D | 100 |
| G21 | E | 60 |

24

INFORMATION PROVIDING DEVICE, INFORMATION PROVIDING METHOD, AND STORAGE MEDIUM, FOR PROVIDING INFORMATION OF USER GROUP

CROSS-REFERENCE TO RELATED APPLICATION

This application is based upon and claims the benefit of priority from the prior Japanese Patent Application No. 2015-171763, filed on Sep. 1, 2015 and Japanese Patent Application No. 2015-171762, filed on Sep. 1, 2015, the entire contents of which are incorporated herein by reference.

BACKGROUND

1. Field

The present invention relates to an information providing technology, and more particularly to an information providing device, an information providing method, and a storage medium for providing information of a user group.

2. Description of the Related Art

There is a system that detects position information of a terminal device held by a user and provides appropriate information to the terminal device according to the position information. For example, whether a current position of a mobile terminal is a user's living area is determined, and regional recommendation information is provided according to the determination (for example, see JP 2009-210400 A). Further, position information of a plurality of mobile terminal devices is detected, mobile terminals having common position information for a predetermined time interval are grouped, and optimum information is provided to the group (for example, see JP 2004-320217 A).

The technique described in JP 2004-320217 A groups the terminal devices (users) on the basis of the position information of the terminal devices, then extracts preference information common to the terminal devices (users) in the group, and provides information matched with the preference information to the terminal devices. That is, information matched with the common part of preference/interest of the users in the group is provided. However, decision making in an actual group is not always based on the common part of the preference/interest of the users. A group's decision is often made on the basis of the preference/interest of a specific user who can be said to be the leader in the group. For example, when five users decide a restaurant to enter, a decision is often made by the preference of a specific user, instead of making a decision on the basis of the common part of the preference for the food of the five users.

Which user's influence is great is on a case by case basis, but for example, an eldest user in the group, a user with knowledge on food, a richest user, or the like may become a leader. Further, a user having the great influence in the group is not always one user, and a plurality of users may have great influence. As described above, in a real group, the influence of the users on decision making is not equal and is often biased to a specific user. However, since the techniques have not considered the power relationship (influence) among users in a group so far, providing useful information to the group with high accuracy has been difficult.

SUMMARY

To solve the above problem, an information providing device of a certain aspect of the present embodiment includes a group forming unit that acquires position information of a subject that is a user or a terminal device, and forms a group including a plurality of subjects on the basis of time series data of the position information pertaining to the plurality of subjects, a point calculator that calculates, on the basis of the time series data of the position information, a characteristic action amount indicating the degree of being matched with a predetermined action pattern in which influence of a subject in the group is high, for each of the plurality of subjects included in the group formed in the group forming unit, and calculates a point that is a numerical value indicating strength of the influence of a subject in the group, for each of the subjects, by adding a plurality of the characteristic action amounts calculated in a predetermined period on and after the group is formed, and a transmitter that transmits information regarding the point calculated in the point calculator or information regarding an item selected on the basis of the point. The group forming unit, the point calculator, and the transmitter are hardware or a combination of hardware and software.

Another aspect of the present embodiment is an information providing method. This method is an information providing method executed by a processor or a computing system, the method including the steps of acquiring position information of a subject that is a user or a terminal device, and forming a group including a plurality of subjects on the basis of time series data of the position information pertaining to the plurality of subjects, calculating, on the basis of the time series data of the position information, a characteristic action amount indicating the degree of being matched with a predetermined action pattern in which influence of a subject in the group is high, for each of the plurality of subjects included in the group formed in the group forming unit, and calculating a point that is a numerical value indicating strength of the influence of a subject in the group, for each of the subjects, by adding a plurality of the characteristic action amounts calculated in a predetermined period on and after the group is formed, and transmitting information regarding the point calculated in the point calculator or information regarding an item selected on the basis of the point.

Still another aspect of the present embodiment is a storage medium. This storage medium stores an information providing program for executing a computer to execute the steps of acquiring position information of a subject that is a user or a terminal device, and forming a group including a plurality of subjects on the basis of time series data of the position information pertaining to the plurality of subjects, calculating, on the basis of the time series data of the position information, a characteristic action amount indicating the degree of being matched with a predetermined action pattern in which influence of a subject in the group is high, for each of the plurality of subjects included in the group formed in the group forming unit, and calculating a point that is a numerical value indicating strength of the influence of a subject in the group, for each of the subjects, by adding a plurality of the characteristic action amounts calculated in a predetermined period on and after the group is formed, and transmitting information regarding the point calculated in the point calculator or information regarding an item selected on the basis of the point.

Note that forms obtained by converting arbitrary combinations of the above constituent elements and expression of

BRIEF DESCRIPTION OF THE DRAWINGS

FIG. 4 is a diagram illustrating a data structure of a database stored in a position information manager in FIG. 2;

FIG. 5 is a diagram illustrating a data structure stored in a group forming unit in FIG. 2;

FIG. 6 is a diagram illustrating a data structure of a database stored in a group information processor in FIG. 2;

FIG. 10 is a diagram illustrating a data structure of a database stored in a user information storage in FIG. 2;

FIG. 11 is a diagram illustrating a data structure of a database stored in a provided information storage in FIG. 2;

FIG. 12 is a diagram illustrating a data structure of information transmitted from a transmitter in FIG. 2;

FIG. 14 is a diagram illustrating a screen displayed on a display 52 in FIG. 13;

FIG. 16 is a diagram illustrating a data structure of a database stored in a user information storage in FIG. 15;

FIG. 17 is a diagram illustrating a data structure of another database stored in the user information storage in FIG. 15;

FIG. 18 is a diagram illustrating a data structure of another database stored in a user information storage according to a third embodiment;

FIG. 23 is a diagram illustrating a data structure of a database stored in a point storage according to the fifth embodiment;

FIG. 27 is a diagram illustrating a data structure of a database stored in a group information processor according to the fifth embodiment;

FIG. 28 is a diagram illustrating a data structure of a database stored in a group information processor according to a sixth embodiment.

DETAILED DESCRIPTION

The invention will now be described by reference to the preferred embodiments. This does not intend to limit the scope of the present invention, but to exemplify the invention.

First Embodiment

First, an outline will be given prior to specific description of the present invention. A first embodiment relates to an information providing system including a plurality of terminal devices and an information providing device connectable to the terminal devices. Users who respectively possess the plurality of terminal devices act in concert to form a group. When making a decision in the group, for example, when deciding a restaurant to enter for a meal, preference of a user having great influence in the group is sometimes reflected. Therefore, the information providing device according to the present embodiment forms the group, using the position information of a plurality of terminal devices and estimates the influence of the users in the group. Further, the information providing device provides optimum information to the group on the basis of the estimated influence. In this way, information based on the position information is provided to the group with sufficient accuracy.

Next, the information provided in the present embodiment will be described. The information providing device provides information of items to the group. The "item" is a term referring to general objects to be used by users, and examples include a store, a product, a service, a web page, and digital content. In the present embodiment, the item is a store such as a restaurant. That is, in the present embodiment, the information providing device provides information of stores such as restaurants to the group. The information providing device may provide information of items in response to a request for information from the group or may provide information to the group at appropriate timing regardless of the presence or absence of the request for information. The above is the description of the outline.

Figure 1:
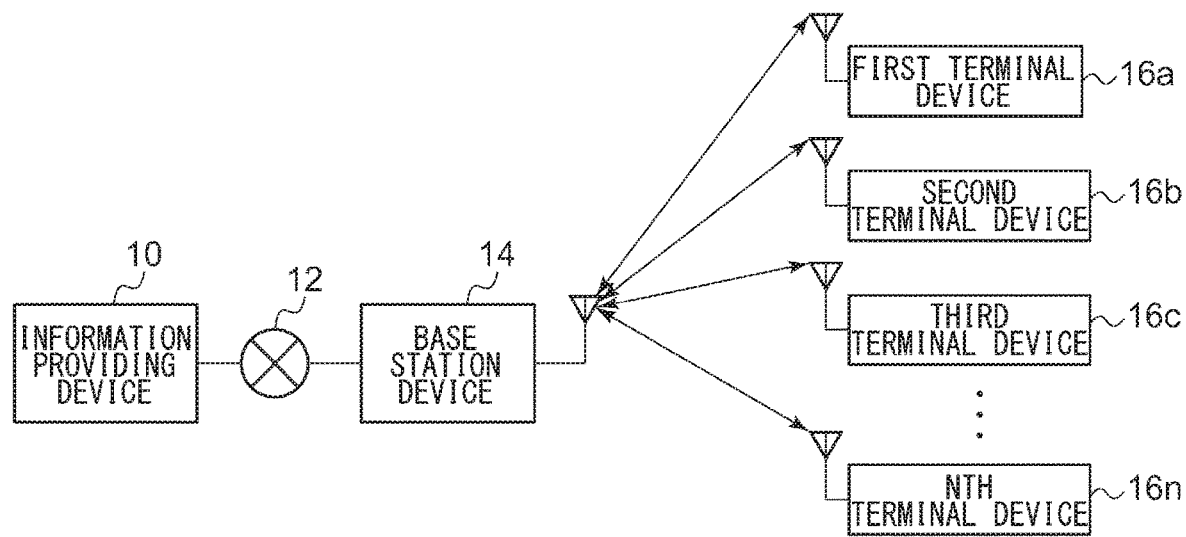
FIG. 1 is a diagram illustrating a configuration of an information providing system according to a first embodiment.

FIG. 1 illustrates a configuration of an information providing system 100 according to the first embodiment. The information providing system 100 includes an information providing device 10, a network 12, a base station device 14, and a first terminal device 16a, a second terminal device 16b, a third terminal device 16c, and an Nth terminal device 16n that are collectively referred to as terminal device 16.

The terminal device 16 corresponds to a wireless communication system and is connected to the base station device 14 described below. Examples of the wireless communication system include, but are not limited to, a mobile phone system, a wireless local area network (LAN) system, and a commercial wireless system. The terminal device 16 is a mobile phone, a smartphone, a tablet terminal, a note personal computer (PC), a wireless device, or the like, and is structured to be easily carriable by the user. The terminal device 16 has a function to acquire position information (latitude, longitude, and the like) by a global positioning system (GPS), wireless LAN, or the like.

The base station device 14 corresponds to the same wireless communication system as the terminal device 16 on one end side, and is connectable with the terminal device 16. Further, the base station device 14 is connected with the network 12 on the other end side. The network 12 is connected to the base station device 14. The network 12 may be an arbitrary network, and may be a wired network, a wireless network, or a combination thereof, for example.

The information providing device 10 is connected to the network 12. With such a structure, the terminal device 16 can communicate with the information providing device 10 via the base station device 14 and the network 12. Therefore, the terminal device 16 transmits acquired position information to the information providing device 10 via the base station device 14 and the network 12. The information providing device 10 forms a group of the terminal devices 16 (users), and selects information suitable for the group on the basis of the received position information. The information providing device 10 transmits information to the terminal device 16 via the network 12 and the base station device 14. Although processing in the information providing device 10 will be described below, hereinafter, the term "subject" meaning the user and/or the terminal device 16 and the term "subject identifier" meaning a user ID or/and a terminal ID may be used.

Figure 2:
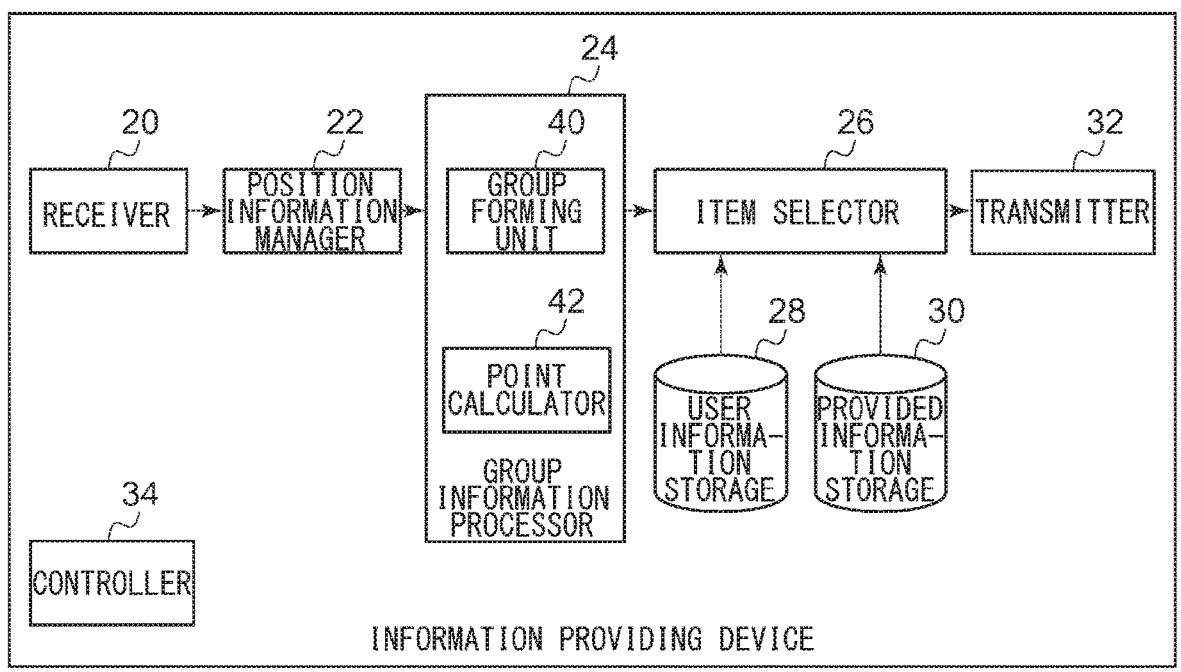
FIG. 2 is a diagram illustrating a configuration of an information providing device in FIG. 1.

FIG. 2 illustrates a configuration of the information providing device 10. The information providing device 10 includes a receiver 20, a position information manager 22, a group information processor 24, an item selector 26, a user information storage 28, a provided information storage 30, a transmitter 32, and a controller 34. The group information processor 24 includes a group forming unit 40 and a point calculator 42.

In terms of hardware, this structure can be realized by a CPU, a memory, and other LSI of an arbitrary computer, and in terms of software, this structure can be realized by a program loaded onto the memory or the like. Here, functional blocks realized in cooperation of the hardware and software are illustrated. Therefore, a person skilled in the art will understand that these functional blocks can be realized in various formed by the hardware only, the software only, or a combination of the hardware and software. For example, a distributed processing system may be constructed, in which the functions of the respective units that structure the information providing device 10 are distributed among a plurality of computers. In that case, distributed processing for causing different computers to correspond to respective functions, such as causing a first computer to be in charge of the group information processor 24 and a second computer to be in charge of the item selector 26 may be performed, or each computer may have all the processors of the information providing device 10.

Figure 3:
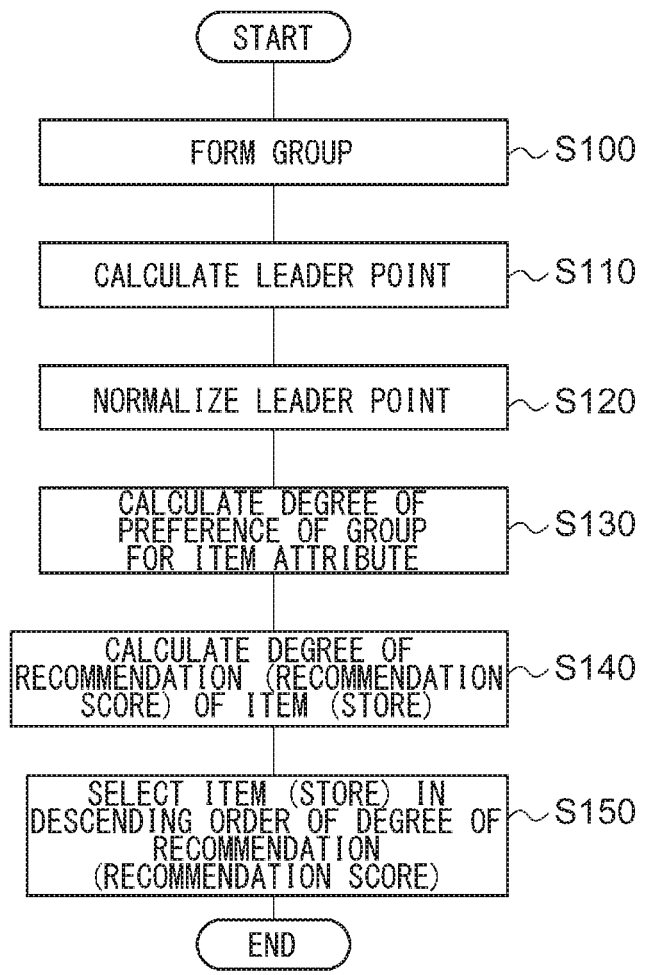
FIG. 3 is a flowchart illustrating an information providing procedure by the information providing device in FIG. 2.

An operation of the information providing system 100 with the above structure will be described. FIG. 3 is a flowchart illustrating an information providing procedure by the information providing device 10. To briefly describe the outline of the processing, first, the group forming unit 40 forms a group (S100). Next, the point calculator 42 calculates a leader point (S110) and normalizes the leader point (S120). Next, the item selector 26 calculates the degree of preference for an item attribute of the group (S130) and calculates the degree of recommendation (recommendation score) of items (stores) (S140). Then, the item selector 26 selects items (stores) in descending order of the degree of recommendation (S150). Details of each step will be described below together with description of each unit illustrated in FIG. 2.

The receiver 20 periodically receives the position information, the terminal ID, and date and time information from each terminal device 16 via the base station device 14 and the network 12. The receiver 20 outputs the position information, the terminal ID, the date and time information to the position information manager 22. The position information manager 22 inputs the position information, the terminal ID, the date and time information from the receiver 20. The position information manager 22 stores the position information, the terminal ID, and the date and time information in association with each terminal device 16. Note that the receiver 20 may be structured not to receive the date and time information from the terminal device 16, and the position information manager 22 may be structured to generate the date and time information on the basis of the date and time when the position information and the terminal ID was acquired. FIG. 4 illustrates a data structure of a database stored in the position information manager 22. For each of a plurality of terminal IDs, the position information corresponding to various types of date and time information is stored. This corresponds to storing time series data of the position information of a plurality of subjects. As described above, the subject indicates the user or the terminal device 16. Note that the position information includes at least information of latitude and longitude. However, the position information may also include information of altitude, a moving direction, acceleration, and the like.

Next, processing of the units will be described using the flowchart in FIG. 3. In step S100, the group forming unit 40 forms a group including a plurality of subjects on the basis of the time series data of the position information of the plurality of subjects stored in the position information manager 22. The group corresponds to putting together the subjects presumed to act (move) together. That is, the group forming unit 40 determines which terminal device 16 belongs to the group, and forms the group. More specifically, the group forming unit 40 determines whether a plurality of the terminal devices 16 exists within a predetermined distance for a predetermined time or more, using the data stored in the position information manager 22, and determines that the plurality of terminal devices 16 belongs to one group when the terminal devices 16 exist. The predetermined time is set to 1 to 10 minutes, for example. Also, the predetermined distance is set to 1 to 50 m, for example.

Here, in a case where the date and time recorded in the position information manager 22 are somewhat different in each terminal ID, it is desirable to correct the latitude and longitude according to the difference in the date and time among the terminal IDs. For example, in a case where the date and time of the first terminal device 16*a* with the terminal ID of "A" is "2015/03/20 10:11:25" and there is no position information of the same date and time corresponding to the second terminal device 16*b* with the terminal ID of "B", two pieces of the position information of date and time adjacent to "2015/03/20 10:11:25" are extracted from the position information of the second terminal device 16*b*. In a case where the two pieces of position information are, for example, "2015/03/20 10:11:00" and "2015/03/20 10:11:26", the two pieces of position information are interpolated and the latitude and longitude of "2015/03/20 10:11:25" of the second terminal device 16*b* are calculated. In this example, a position obtained by internally dividing the position at "2015/03/20 10:11:00" and the position at "2015/03/20 10:11:26" into 25:1 is calculated. Note that the interpolation of the position information is not limited to such linear interpolation, and nonlinear interpolation processing using three or more pieces of position information may be performed.

Here, a technique of performing the group determination in the group forming unit 40 will be described with reference to FIG. 5. FIG. 5 illustrates a data structure stored in the group forming unit 40. FIG. 5 illustrates the first terminal device 16*a* to an eighth terminal device 16*h* existing in a predetermined range of area and average distances (m, meter(s)) between each two of the terminals in a certain time zone (for example, 2015/1/1 10:00 to 10:03). Note that the terminal ID of the first terminal device 16*a* is "A", the terminal ID of the second terminal device 16*b* is "B", the terminal ID of the third terminal device 16*c* is "C", and the terminal ID of the fourth terminal device 16*d* is "D". Similarly, the terminal ID of the eighth terminal device 16*h* is "H". The average distance is a value obtained by calculating the distance between arbitrary two terminal devices 16 existing in a certain area at every predetermined time interval (for example, every one second) in a predetermined length of period (for example, three minutes), and calculating an average of the distances.

The group forming unit 40 applies, to the data, a rule to determine that the terminal devices belong to the group when the average distance between the terminals is smaller than or equal to 10 m (first threshold value). As a result, the first terminal device 16*a* to the fifth terminal device 16*e* belong to a first group, the sixth terminal device 16*f* and the seventh terminal device 16*g* belong to a second group, and the eighth terminal device 16*h* belongs to a third group. Note that the group forming unit 40 may set a minimum value of the number of terminals forming one group, and may not form a group when the number does not satisfy the minimum value. For example, when a condition of at least three terminal devices 16 is applied, only the first group is formed in the data example illustrated in FIG. 5. Further, the group forming unit 40 may set a maximum value of the number of terminals forming one group. Further, the group forming unit 40 may calculate a maximum value of the distances instead of the average value of the distances between the terminals in the predetermined period, and form the group, using the maximum value. Further, the group forming unit 40 may calculate variance or standard deviation indicating the magnitude of variation in the distances between the terminals, and form a group, using the variance or standard deviation.

For example, the group forming unit 40 may determine that the terminals belong to the group when the average value of the distances between the terminals in the predetermined period is smaller than or equal to the first threshold value, and the standard deviation of the distances between the terminals is smaller than or equal to a third threshold value. By use of the standard deviation, a probability of erroneously recognizing that the terminal device 16 not acting with the group as the terminal device 16 belonging to the group is decreased. Further, in a case where the number of candidate terminals forming one group is comparatively large, the group forming unit 40 may execute processing of forming a group when the number of terminals having the distance between the candidate terminals of the group, the distance exceeding the first threshold value, is smaller than or equal to a predetermined number, and the maximum value of the distance is smaller than or equal to a second threshold value, even when the distance exceeds the first threshold value.

For example, in the group determination processing, when the number of terminal devices 16 that are the candidates for a certain group is larger than or equal to a predetermined number (for example, seven), the following processing is performed. Here, assuming that the number of candidate terminal devices 16 of a certain group is ten, and the maximum value of the distances between one terminal device 16 (hereinafter referred to as "terminal to be determined) and the other nine terminal devices 16 is 18 m and the second largest distance is 10 m, and the maximum value of the distances between two of the other nine terminal devices 16 is 9 m. In this case, the number of terminals having the distance exceeding the first threshold (for example, 10 m) for the group determination is one, and this number is smaller than or equal to a predetermined number (for example, two), and the maximum value (18 m) of the distance is smaller than or equal to the second threshold value (for example, 20 m). Therefore, the group forming unit 40 determines that the terminal to be determined belongs to the group. Note that the group determination processing is not limited to the above-described method, and for example, the group forming unit 40 may perform determination using processing of applying various techniques of known cluster analysis to the distances between the terminals, and causing formed clusters to correspond to a group.

The group forming unit 40 generates a new group ID every time forming one group, and stores the group ID in a storage in the group information processor 24 as a database illustrated in FIG. 6. FIG. 6 is a diagram illustrating a data structure of a database stored in the group information processor 24. The database associates a group ID, a terminal ID (user ID), and a leader point (Rp), and is also called group information table. The leader point is a numerical value estimating influence of a user in the group on the basis of an action of the user in the group. The greater this value, the greater the influence of the user (terminal device 16). Although not illustrated in FIG. 6, the date and time (group start date and time) when the group was formed may be further recorded in the database. Furthermore, the date and time (group termination date and time) when the group was canceled may be recorded in the database. For example, the group ID, the terminal ID (user ID), the leader point (Rp), the group start date and time, and the group termination date and time may be associated and stored as a group information table.

FIG. 6 illustrates a state in which a group with a group ID "G1" and a group with a group ID "G2" are formed. The example illustrated in FIG. 6 indicates a state in which "G2" is formed after "G1" is formed and canceled. The group with the group ID "G1" includes the first terminal device 16*a*, the second terminal device 16*b*, and the third terminal device 16*c*. Respective leader points are "20", "50", and "30". A leader point calculation method will be described below. The group with the group ID "G2" includes the first terminal device 16*a*, the third terminal device 16*c*, the sixth terminal device 16*f*, and the seventh terminal device 16*g*, and is in an initial state where the group has been formed. In this way, in the initial state in which the group has been formed, the leader point of each user is "0". Note that the leader point stored in the group information table is updated as needed until one group action is terminated. Further, after one group action is terminated, the values are maintained without being updated. A term "temporary point" may be used to represent a leader point in an update continuation state.

Figure 7:
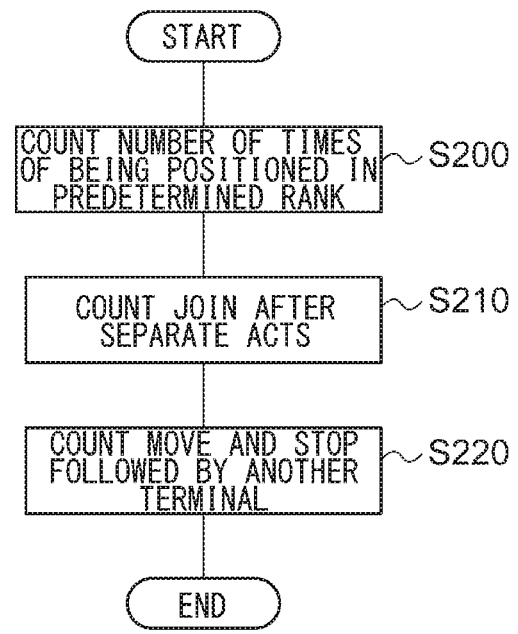
FIG. 7 is a flowchart illustrating a procedure of updating a leader point by the information providing device in FIG. 2.

The point calculator 42 estimates the influence in decision making among the users in the group, using the time series data of the position information stored in the position information manager 22. Specifically, in step S110, the point calculator 42 calculates an influence value (leader point) as an index representing the influence of each user. That is, the point calculator 42 analyzes the time series data of the position information of each terminal ID, and calculates a characteristic action amount indicating the degree of being matched with a predetermined action pattern in which the influence of a subject in the group is high, for each of a plurality of subjects included in the group. Further, the point calculator 42 calculates or updates the leader point (temporary point) for each subject on the basis of the characteristic action amount. Hereinafter, this processing will be described in detail using the flowchart of FIG. 7.

The point calculator 42 calculates a leader point having a value that becomes higher as the rank determined depending on the position of the subject is higher. Specifically, in step S200, the point calculator 42 defines a subject being positioned in predetermined rank (order) from the head of the group with reference to a moving direction of the group, as a first predetermined action pattern, and calculates the number of times of the subject positioning in the predetermined rank, as the characteristic action amount. Typically, the point calculator 42 counts the preceding frequency of the user. The preceding frequency is the number of times of the user being positioned at the headmost position of the group with reference to the moving direction of the group.

Figure 8:
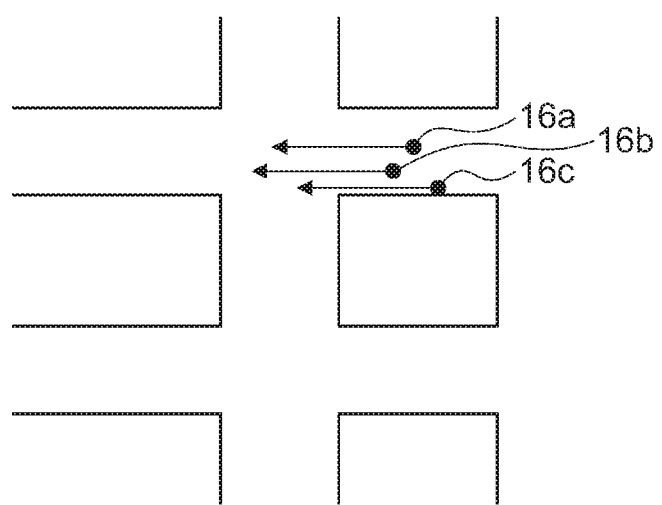
FIG. 8 is a diagram illustrating an outline of processing in a point calculator in FIG. 2.

An outline of the processing in step S200 will be described using FIG. 8. In the example illustrated in FIG. 8, the first terminal device 16a, the second terminal device 16b, and the third terminal device 16c are moving in the direction of the arrow. The point calculator 42 compares a predetermined number (for example, 100 times) of latest to past pieces of latitude and longitude information to identify the user positioned at the head in the group with respect to a traveling direction, from the information of the terminal IDs and the latitude and longitude stored in the position information manager 22. Further, the point calculator 42 counts the number of times (preceding frequency) of being in a preceding position for each terminal ID. Further, the point calculator 42 calculates an influence value (leader point) indicating the influence of the user, using the preceding frequency. For example, assuming that the respective numbers of times of being at the head of the third terminal device 16c, the first terminal device 16a, and the second terminal device 16b are 60 times, 30 times, and 10 times, of the position information measured 100 times. In that case, the respective leader points of the third terminal device 16c, the first terminal device 16a, and the second terminal device 16b are "60", "30", and "10". Alternatively, in a case where the position information of each of the terminal devices 16 is updated in every predetermined time (for example, five seconds), processing of identifying the terminal device 16 positioned at the head of the group, and increasing the leader point by a predetermined value (for example, "1") may be performed in every update timing.

The characteristic action amount may be used as the leader point as it is, as described above, or a value obtained by multiplying the characteristic action amount by a predetermined coefficient or the like may be used as the leader point. Such processing is based on the knowledge that the influence of the user walking at the head of the group tends to be largest when people move in a group. Especially, when the group is moving while searching for an appropriate store suitable for a certain purpose, such tendency prominently appears. The leader point can be said to be an index representing the influence of the user of the group in searching for and selecting an item such as a store or a product. The point calculator 42 adds the calculated leader point (the leader point pertaining to the preceding frequency) to the leader point of the group information table to update the group information table.

Note that the processing is not limited to the case of the user being positioned at the headmost position, and the point calculator 42 may count the number of times of being positioned in predetermined rank such as the second from the head or the third from the head. Further, the point calculator 42 may calculate the characteristic action amount such that a larger value is obtained as the rank of the position from the head is higher. That is, the point calculator 42 may set a larger value to the leader point as the rank of the position from the head is higher. This corresponds to adding a leader point with a varied value according to the rank (order) from the head. For example, in a case of being positioned second from the head, a leader point of 50% of the case of being positioned at the headmost position is added, and in a case of being positioned third from the head, a leader point of 20% of the case of being positioned at the headmost position is added.

Further, the point calculator 42 may determine the position rank from the head to be used for leader point calculation according to the number of subjects included in the group. For example, when the number of people in the group is small (in a case of less than a first predetermined number), only the first position from the head is taken into consideration. When the number of people in the group is medium (in a case of larger than or equal to the first predetermined number and less than a second predetermined number), positions up to the second position from the head are taken into consideration. Further, when the number of people in the group is large (in a case of larger than or equal to the second predetermined number), positions up to the third position from the head are taken into consideration.

The point calculator 42 may set a moving distance while being positioned at the head of the group to be the characteristic action amount instead of the preceding frequency, and calculate the leader point, using the characteristic action amount. For example, assuming that the first terminal device 16a moves by 500 m in a state of being positioned at the head, the second terminal device 16b moves by 300 m in a state of being positioned at the head, and the third terminal device 16c moves by 100 m in a state of being positioned at the head, within a predetermined time. Under the circumstance, respective characteristic action amounts are "500", "300", and "100", where the moving distance in meters is set to the characteristic action amount. The point calculator 42 may set a value obtained by multiplying the characteristic action amount by "0.1" to be the leader point, and calculate the respective leader points as "50", "30", and "10". That is, the point calculator 42 may calculate the leader point such that a larger value is obtained as the moving distance while being positioned at the head is longer.

The point calculator 42 may set a length of time in which each terminal device 16 is positioned at the head of the group to be the characteristic action amount, and calculate the leader point, using the characteristic action amount. For example, assuming that the time during which the first terminal device 16a is positioned at the head is two minutes, the time during which the second terminal device 16b is positioned at the head is seven minutes, and the time during which the third terminal device 16c is positioned at the head is one minute, during ten minutes (predetermined time). Under the circumstance, respective characteristic action amounts are "2", "7", and "1", where the time in minutes is set to the characteristic action amount. The point calculator 42 may set a value obtained by multiplying the characteristic action amount by "10" to be the leader point, and calculate the respective leader points as "20", "70", and "10". That is, the point calculator 42 may calculate the leader point such that a larger value is obtained as the time during which the terminal device is positioned at the head is longer. Further, the point calculator 42 may calculate the leader point in arbitrary combination of the characteristic action amounts pertaining to the number of times, the time, and the distance, of being positioned at the head of the group.

Next, in step S210, in a case where one group is divided into a plurality of groups and then the groups are joined, the point calculator 42 defines a pattern of a subject moving during the time of division in a post-join moving direction, as a second predetermined action pattern, and calculate the number of times of join after division, as the characteristic action amount. At that time, the point calculator 42 determines whether a small post-division group (including one user) joins another post-division small group or is joined by another post-division small group with reference to the moving direction of the group after join. That is, the point calculator 42 determines that a small post-division group moving during the time of division in the same direction as a direction after join, as a group joined by another post-division small group, and adds the leader point of the user in the small post-division group joined by another post-division small group.

Figure 9A:
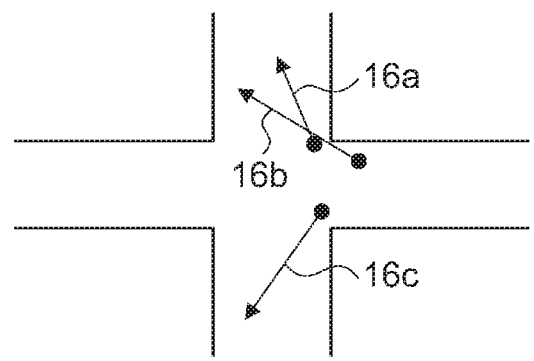
FIGS. 9A and 9B are diagrams illustrating an outline of another processing in the point calculator in FIG. 2.
Figure 9B:
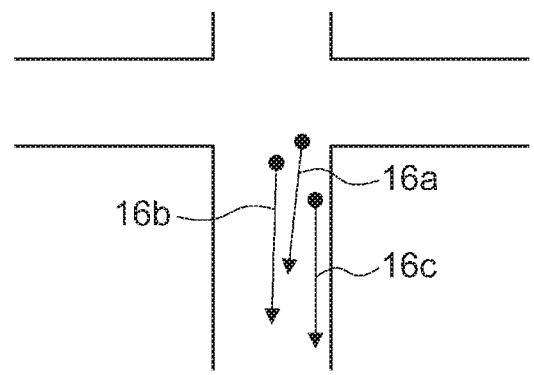

Here, in a case where a plurality of grouped terminal devices 16 separately acts, and then the groups are joined again, the preceding terminal ID in the group joined by another group can be considered to have influence on the group, and thus the point calculator 42 adds the leader point to the terminal ID. FIGS. 9A and 9B illustrate an outline of the process in the point calculator 42. In FIG. 9A, the third terminal device 16c move in a direction different from those of the first terminal device 16a and the second terminal device 16b. In FIG. 9B, followed by FIG. 9A, the first terminal device 16a and the second terminal device 16b join the third terminal device 16c, and the three terminal devices 16 move in the same direction. When the point calculator 42 detects such an action pattern, the point calculator 42 adds a predetermined value (for example, "30") to the leader point of the joined terminal device 16 (in this example, the third terminal device 16c) in every join action.

That is, the point calculator 42 updates the group information table by adding the leader point pertaining to the join action to the leader point of the group information table. In a case where the small group on the joined side includes a plurality of users, the point calculator 42 may add the leader point to all the users or may limit the users to users positioned in predetermined rank (for example, the first and second positions) from the head and add the leader point. Further, the point calculator 42 may change the leader point to be added according to the rank from the head in the small group on the joined side. For example, the point calculator 42 adds leader points such as "30" to the user at the head, "20" to the second user from the head, and "10" to the third user from the head.

The point calculator 42 may calculate the leader point on the basis of the number of subjects included in a small group when a group is divided into a plurality of groups. That is, the point calculator 42 may calculate the value of the leader point pertaining to the join action according to the number of users who separately acts (the number of users who join another group). Specifically, the point calculator 42 calculate the value of the leader point pertaining to the join action such that a larger value is obtained as the number of users who separately act is larger (the number of users in the small group joining another group is larger). For example, the point calculator 42 adds the leader point of "20" in a case where two users separately act and then join the group, "30" in a case where three users separately act and then join the group, or "40" in a case where four users separately act and join the group.

The point calculator 42 may calculate the value of the leader point pertaining to the join action according to the number of users on the joined side. Specifically, the point calculator 42 calculate the leader point that becomes smaller as the number of users on the joined side is larger, and adds the leader point to each of the users on the joined side. For example, the point calculator 42 adds the leader point of "50" in a case where the number of users on the joined side is one, "30" to each of two users in a case of two users, or "10" to each of three users in a case of three users. Further, in a case where there is a plurality of users on the joined side, the point calculator 42 may add the leader point pertaining to the join action to a user positioned at the head, of the plurality of users. That is, the point calculator 42 may calculate the leader point having a smaller value as the number of users on the joined side is larger, and add the leader point pertaining to the join action to the user positioned at the head. For example, the point calculator 42 adds the leader point of "50" in a case where the number of users on the joined side is one, "40" to the user positioned at the head in a case of two users, or "30" to the user positioned at the head in a case of three users.

Next, in step S220, the point calculator 42 defines, in a case where a subject stops, a pattern of another subject stopping following the stop, as a third predetermined action pattern, and calculates the number of times of move and stop, as the characteristic action amount. The stop following the stop is a situation where another terminal device 16 (a terminal device 16 other than the first terminal device 16a in the group) stops immediately after a certain terminal device 16 (for example, the first terminal device 16a) stops. This situation is likely to a situation where a user who first conducts move and stop finds a store or the like, stops walking, and considers whether entering the store. Therefore, the point calculator 42 adds a predetermined value (for example, "20") to the leader point of the terminal device 16 that has first conducted move and stop, in every move and stop of another terminal device 16.

The point calculator 42 may calculate the leader point on the basis of the number of another subjects that stop following the stop. Specifically, the point calculator 42 calculate the leader point that becomes a larger value as the number of users who stops later is larger. For example, the point calculator 42 adds the leader point of "20" in a case where two users stop, "30" in a case where three users stop, and "40" in a case where four users stop. Further, in a case where there is mixture of a user who stops later and a user who continues moving without stop, the point calculator 42 may calculate the leader point pertaining to the stop action according to a ratio of the user who stops later. For example, the point calculator 42 calculates the ratio of the number of users who stops as Ns÷(Ns+Nc), where the number of users who stop is Ns and the number of users who continues moving is Nc. Further, the point calculator 42 adds the leader point of "40" in a case where the ratio is larger than or equal to 80%, "30" in a case where the ratio is larger than or equal to 60% and less than 80%, "20" in a case where the ratio is larger than or equal to 40% and less than 60%, or "0" in a case where the ratio is less than 40%. In this manner, the point calculator 42 may calculate the leader point that becomes a larger value as the ratio of the number of users who stops is larger.

The point calculator 42 may perform determination in a probabilistic manner in addition to a conclusive manner in determining whether the time series data of the position information of each of the terminal devices 16 is matched with at least any of the first to third predetermined action patterns. In that case, the point calculator 42 uses a probability model having the time series data of the position information as an input and a probability value corresponding to the predetermined action pattern of each of the terminal devices 16 as an output.

For example, in the processing for the first predetermined action pattern in step S200, in a case where two terminal devices 16 from the head of the group are substantially side by side, the point calculator 42 calculates the probability of the first terminal device 16a ranking first during a predetermined period (for example, one minute) as "0.75", or the like. At that time, the point calculator 42 calculates the probability of the second terminal device 16b ranking first as "0.25", or the like. The case where the terminal devices are substantially side by side is, for example, a case where which of the terminal devices ranks first is not clear, a case where the first place and the second place of the group are frequently switched during a short time and the state is not stable, or the like.

Further, for example, in the processing for the third predetermined action pattern in step S220, in a case where the first terminal device 16a stops movement and another terminal device 16 does not stop although substantially slows down and slowly advances, the point calculator 42 calculates the probability of being matched with the third predetermined action pattern as "0.2", or the like. The point calculator 42 may use the calculated probability value as the characteristic action amount as it is, or may use a value obtained by multiplying the probability value by a predetermined value (for example, 100 times) as the characteristic action amount.

As described above, the characteristic action amount can be said to be an index representing the degree (the number of times, the time, the distance, or the probability) that the time series data of the position information of a certain subject is matched with a predetermined action pattern determined to have great influence of a subject in a group. Furthermore, since the leader point is a sum total of the characteristic action amount of each subject during a predetermined period (for example, from the point of time of group formation to the point of time of cancellation of the group), the leader point becomes higher (larger) as the characteristic action amount is greater (larger).

Returning back to the description of the flowchart in FIG. 3. In step S120, the point calculator 42 normalizes the leader points (influence values) of the terminal IDs. For example, in a case where the number of users in the group is three, the leader points of the users are normalized such that a total value of the leader points of the three users becomes "1.0" or "100". Alternatively, normalization may be performed such that a leader point maximum value of the members in the group becomes a predetermined value (for example, "100"). The normalization processing is executed at predetermined time intervals (for example, once in one minute), every time the group moves by a predetermined distance (for example, 100 m), or every time the group stops the movement for larger than or equal to a predetermined time (for example, 30 seconds). Further, the normalization processing may be executed at timing when the information providing device 10 receives the request for information from the terminal device 16 of the group. The point calculator 42 reads the leader point of the terminal ID=i (i=1 to N) from the group information table and calculate a total value of the leader points, where the number of users (terminal devices 16) belonging to a group to be processed is N. The point calculator 42 may set a value obtained by dividing the leader point by the total value to be a normalized leader point. The point calculator 42 stores the group ID, the terminal ID, and the calculated normalized leader point to a storage in the point calculator 42 in association with one another. By storing the normalized leader point to a different area from the database where the leader point illustrated in FIG. 6 is stored, the normalized leader can be calculated and information providing processing can be performed even when the group action continues and update of the leader points of the terminal devices 16 continues. Note that this normalization processing may be omitted and an unnormalized leader point can be used in the following processing. Hereinafter, the leader point of the user belonging to the group to be processed is P[i] (i=1 to N). Assuming that P[i] is normalized in the following description.

The item selector 26 selects an item to be presented to the group such that a subject having a high leader point calculated in the point calculator 42 is prioritized. Therefore, in step S130, the item selector 26 derives the degree of preference for the item attribute of the group by adding, while weighting with the leader point of each subject calculated in the point calculator 42, the degree of preference for an item attribute in the user corresponding to each subject. Here, the item attribute is attribute information indicating a property of an item. For example, to express a property of a store, item attributes such as the genre of food offered in the store, the size of the store (large, medium, small, etc.), the type of location (downtown, suburbs, etc.), the type of the atmosphere (luxury, common touch, lively, quiet, etc.) can be used. In this embodiment, a food category is used as the item attribute. However, processing using other item attributes is also possible. Further, one item attribute (for example, Japanese food) typically corresponds to a plurality of items (for example, restaurant 1, restaurant 2, and restaurant 3). Specifically describing the processing of step S130, the item selector 26 acquires preference information indicating the preference of the food genre for each terminal ID in the group from the user information storage 28.

The user information storage 28 stores the preference information of the user for each terminal ID for identifying the terminal device or for each user ID for identifying the user. FIG. 10 illustrates a data structure of a database (user preference database) stored in the user information storage 28. The present embodiment assumes a form in which one user occupies and uses one terminal device 16 such as a mobile phone/smart phone, and the terminal ID and the user ID are substantially equal. In the present embodiment, the preference information of the user who uses the terminal device 16 is managed for each terminal ID. However, a form in which one terminal device 16 is used by a plurality of users, using both the terminal ID and the user ID is also possible. As illustrated in FIG. 10, the preference information (the degree of preference) for the food genre of the user is illustrated, and the numerical value (score) is quantification of the number of times to visit the store of each of the genres and the degree of liking for each of the genres. In the example illustrated in FIG. 10, normalization is performed such that a total of the degrees of preference of each of the terminal IDs becomes a fixed value. However, an embodiment is not limited to the example, and the degree of unnormalized preference may be used.

The item selector 26 calculates the degree of preference A[j] for a food genre j of the group as follows, where the total number of food genres is M and the degree of preference of a terminal device i (terminal ID=i) for the food genre j (j=1 to M) is F[i] [j]. That is, the degree of preference of the user having a larger leader point is more strongly reflected in the degree of preference of the group.

[Expression 1]

$$A[j] = \sum_{i=1}^{N} P[i]F[i][j] \qquad (1)$$

The item selector 26 selects an item on the basis of the degree of preference for the item attribute in the group derived in step S130 (on the basis of the degree of preference for the food genre). To conduct the selection, in step S140, the item selector 26 calculates the degree of recommendation (recommendation score) of each item (store) for the group. At that time, the item selector 26 refers to the database stored in the provided information storage 30. The provided information storage 30 stores information in which a store ID for identifying a store, a store name, a genre of food offered by the store, location information of the store (latitude and longitude), an address, a contact information (a telephone number, a mail address, etc.), a descriptive text introducing the store, and an evaluation point are associated with one another. FIG. 11 illustrates a data structure of a store database stored in the provided information storage 30. The evaluation point is a quantification of the store's reputation. Like a word-of-mouth site on the Internet, the evaluation point may be created by voting/posting by many users or may be scored by cooking experts or critics. In the example of FIG. 11, a score out of 100 full points is used. In addition, one store may correspond to a plurality of food genres. For example, a store may correspond to both "French" and "Italian".

More specifically, the item selector 26 calculates the degree of recommendation S[k] (k=1 to K) of a store k for the group as follows, where the total number of stores (stores to be recommendation candidates) added in the store database is K and the evaluation point of the store k (k=1 to K) is R[k]. Here, δ(k, j) is a function that returns "1" when the store k corresponds to the food category j, and "0" when the store k does not correspond. That is, the processing by the expressions (1) and (2) can be said to be processing of calculating the degree of recommendation of each item in the group by adding, while weighting with the leader point, the degree of preference for the item attribute, of each of members forming the group for the item attribute. Note that stores of which the degree of recommendation is calculated may be narrowed down according to the current position of the group or the distance between the current position of the group and a store may be reflected in the degree of recommendation of the store, etc.

[Expression 2]

$$S[k] = \sum_{j=1}^{M} \delta(k, j)A[j]R[k] \qquad (2)$$

Then, in step S150, the item selector 26 selects a predetermined number of stores in descending order of the degree of recommendation S[k] (k=1 to K) from the stores added in the store database. Alternatively, a store with the degree of recommendation that is larger than or equal to a predetermined value may be selected. The item selected in the item selector 26 is also referred to as "recommended item". In this manner, the item selector 26 selects an item on the basis of the leader point calculated in the point calculator 42. For example, assuming that the preference information is illustrated like FIG. 10, and the numbers of times that the third terminal device 16c was at the head of the group is 60 times, the number of times that the first terminal device 16a was at the head is 30 times, and the number of times that the second terminal device 16b was at the head is 10 times, of the position information measured 100 times. The influence values of the terminal IDs are the first terminal device 16a=0.3, the second terminal device 16b=0.1, and the third terminal device 16c=0.6. As a result, the degree of preference for Japanese food of the group is "5×0.3+2×0.1+2× 0.6=2.9". Calculation for other food genres is similarly performed, and French=1.9, Italian=4.9, Ethnic=2.4, and fast food=3.9 are obtained. In this group, the degree of preference for Italian is highest.

Here, the degree of recommendation of the store is calculated using the leader points of all the users in the group. However, another method may be used. For example, the item selector 26 may select one user having the highest leader point in the group, and use the degree of preference itself of the user as the degree of preference of the group. That is, the item selector 26 may determine recommendation information (information of a recommended store) using the preference information of one user having the greatest influence. Further, the item selector 26 may select a predetermined number of users in descending order of the leader points in the group, and determine the recommendation information on the basis of the leader points of the selected users.

In the above description, the item (store) is selected after calculating the group's preference for the item attribute (food genre). However, the preference of the group for the item (store) may be directly calculated without calculating the preference of the group for the item attribute. For example, preference by store data (not illustrated, can also be said to be item preference data of a user) in which a terminal ID(i), a store ID(k), and the degree of preference Fs[i][k] correspond to one another is stored in the user information storage 28, instead of the user preference database in FIG. 10. Then, the degree of recommendation S[k] (k=1 to K) of the store k can be calculated using the expression (3) instead of the expressions (1) and (2).

[Expression 3]

$$S[k] = \sum_{i=1}^{N} P[i]Fs[i][k]R[k] \qquad (3)$$

That is, the degree of recommendation of each item in the group is calculated by adding, while weighting with the leader point, the degree of preference of each of members forming the group for the item. Here, in a case where the degree of preference of the terminal i for the store k is not added, Fs[i] [k]=0. Further, R[k] is the evaluation point of the store k added in the store database. However, the degree of recommendation S[k] may be calculated without using R[k]. That is, the degree of recommendation may be calculated with R[k]=1 in the expression (3).

By the method using the expression (3), the degree of recommendation can be calculated with high accuracy in a case where the degree of preference of the terminal device 16 of the group has been registered for many stores. The accuracy of the degree of recommendation is decreased in a case where registered preference data by store is small. Further, there is a constraint that a store cannot be recommended if the degree of preference for the store, of at least one member in the group, is registered, and there is a problem that the number of recommended items cannot be sufficiently obtained. On the other hand, the method of calculating the degree of preference of the group for the item attribute described above can have a larger number of stores as recommendation candidates and thus can easily obtain a sufficient number of recommended items.

Further, the item selector 26 may determine whether the group has visited the store or the like described in the recommendation information and reflect the information in the next recommendation information. Whether the group has visited the store or the like described in the recommendation information can be determined by whether the position information of the terminal devices 16 of the group is substantially matched with the position information of the store for a predetermined time (for example, five minutes) or more. In a case where the group acts according to the recommendation information, such recommendation is more likely to be accepted by the group in the future, and thus the item selector 26 performs processing such that the same information or similar information can be easily included in the next or subsequent recommendation information.

Specifically, to update user preference information F as illustrated in FIG. 10, the item selector 26 adds a larger numerical value in a case where the store is visited on the basis of the recommendation information than other visits. For example, in the example illustrated in FIG. 10, processing of increasing the numerical value by "2" in a case where a store is visited according to the recommendation information may just be performed, while the numerical value is usually increased by "1" for each visit to the store. Further, the item selector 26 may store the preference by store data (not illustrated) in which a terminal ID, a store ID, and the degree of preference correspond to one another to the user information storage 28, and perform processing of making the degree of preference larger, of the store (store ID) visited by the user (terminal ID) according to the recommendation information than normal processing, other than making the score of the appropriate food genre larger than usual. Further, the item selector 26 may perform processing of reflecting the preference by store data at the time of creating the next recommendation information. Further, the item selector 26 may perform processing of making the degree of preference of the preference by store data smaller in a case where the group has not visited the store or the like described in the recommendation information, and perform processing such that the store that has been recommended but not visited this time is less likely to be included in the next recommendation information.

The controller 34 controls the entire information providing device 10. Further, the controller 34 causes the transmitter 32 to transmit information (recommendation information) regarding the item (recommended item) selected by the item selector 26. Specifically, the controller 34 reads necessary data regarding the recommended item from the store database illustrated in FIG. 11, creates recommendation information, and causes the transmitter 32 to transmit the recommendation information. The transmitter 32 transmits the recommendation information to the terminal device 16 of the group via the network 12 and the base station device 14. This transmission (providing of the recommendation information) may be periodically performed by the information providing device 10 or may be transmitted as a response in response to a request for information from at least one terminal device 16 in the group. In a case where the information providing device 10 periodically transmits the information, the information may be transmitted at predetermined time intervals (for example, one in one minute) in a period in which the group is formed or may be transmitted every time the group moves by a predetermined distance (for example, 100 m), for example. Further, the information providing may be stopped upon detecting cancellation of the group. Further, in a case where the group stops for a long time at the position matched with the latitude and longitude of a store added in the store database, the group can be determined to enter a certain store, and thus the information providing may be stopped. Note that the information providing device 10 can accurately grasp the number of terminals (the number of members) of the group. Therefore, whether all the members can enter the store may be presented in providing the recommendation information, in combination of data indicating availability of the store. Further, the item selector 26 may select a recommended store from the stores that all the members of the group can enter, and provide the recommendation information based on the selection. FIG. 12 illustrates a data structure of information transmitted from the transmitter 32. As illustrated in FIG. 12, information (recommendation information) of recommendation stores is formed in a ranking form, and includes a recommendation rank, a store ID, the degree of recommendation (recommendation score), a store name, store description, current availability, store location information (latitude and longitude), an address, a contact information (a telephone number, a mail address, etc.), the distance from the current position of the terminal device 16, and the like.

Figure 13:
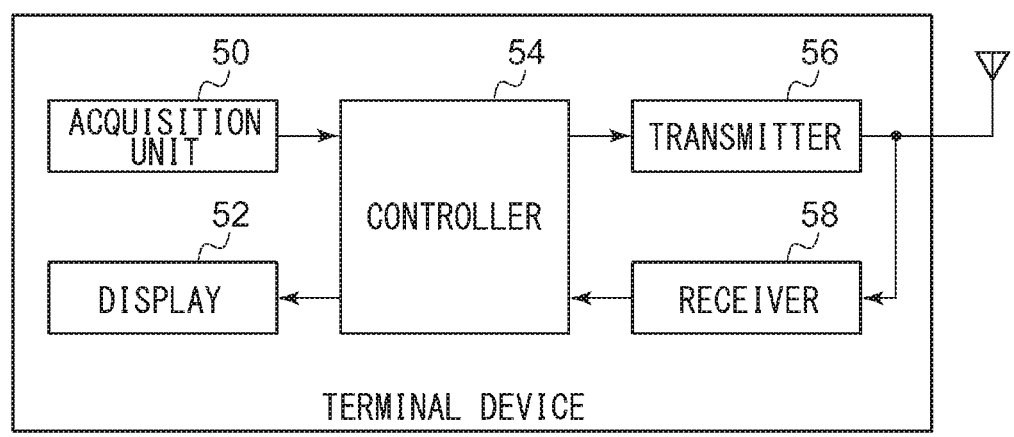
FIG. 13 is a diagram illustrating a configuration of a terminal device in FIG. 1.

FIG. 13 illustrates a configuration of the terminal device 16. The terminal device 16 includes an acquisition unit 50, a display 52, a controller 54, a transmitter 56, and a receiver 58. The acquisition unit 50 has a positioning function using a GPS, a wireless LAN, or the like, and periodically acquires the position information of the subject that is the user or the terminal device 16 by measuring the position of the terminal device 16. The position information is indicated by latitude and longitude. The acquisition unit 50 sequentially outputs the position information to the controller 54.

The controller 54 sequentially inputs the position information from the acquisition unit 50. The controller 54 controls timing of communication in the transmitter 56 and the receiver 58. When transmission timing arrives, the controller 54 sequentially outputs the position information to the transmitter 56. The transmitter 56 transmits the position information sequentially input from the controller 54 to the information providing device 10 via the base station device 14 and the network 12. Such position information is sequentially transmitted, and thus corresponds to transmitting the time series data of the position information. Further, as described above, the terminal ID and the date and time information are also transmitted together with the position information. Note that, as described above, the terminal device 16 may not transmit the date and time information.

The receiver 58 receives the information (recommendation information) of items selected in the information providing device 10 to which the time series data of the position information has been transmitted by the transmitter 56 from the information providing device 10 via the base station device 14 and the network 12. The information providing device 10 may periodically transmit the recommendation information to the terminal device 16. Further, data (a recommendation information request) that requests the recommendation information may be transmitted from the transmitter 56 to the information providing device 10, the information providing device 10 may transmit the recommendation information as a response, and the receiver 58 may receive the recommendation information. The receiver 58 outputs the received information to the controller 54. The controller 54 causes the display 52 to display the information (recommendation information) of items received by the receiver 58. The display 52 displays a screen as illustrated in FIG. 14. As illustrated in FIG. 14, information such as a recommendation rank, a store name, store description, current availability, an address, the distance from current position is displayed for each recommended store. Here, the recommendation rank is information that roughly indicates the magnitude of the degree of recommendation and is information created by the controller 54 on the basis of the degree of recommendation. For example, in a case where the degree of recommendation is a numerical value in a range of 0 to 10, the recommendation rank may be determined using a predetermined rule such as a store having the degree of recommendation of larger than or equal to 8 getting "*", a store having the degree of recommendation of larger than or equal to 6 and less than 8 getting "", and a store having the degree of recommendation of less than 6 getting "*". Note that the information providing device 10 may transmit the recommendation rank. Alternatively, the degree of recommendation may be displayed as it is instead of the recommendation rank. Note that the store ID included in the recommendation information is not particularly meaningful for the user, and may thus be displayed or not displayed. Processing can be efficiently performed by transmitting the store ID of the store specified by the user from the terminal device 16 to the information providing device 10 in a case where the user requests detailed information of the specific store. Further, in the example illustrated in FIG. 14, a "display map" button and a "contact" button are displayed for each recommended store. When the user presses the "display map" button, the location information (latitude and longitude) or the address of the store is transmitted to a map application built in the terminal device 16 or to an external map providing service, and the store is displayed on the map. When the user presses the "contact" button, the user can communicate with the store via a call application built in the terminal device 16, a mail application, an external communication service, or the like. Further, as illustrated in FIG. 14, a name of an area where the group is located and the number of people in the group may be displayed such as "a list of restaurants recommended for groups of five in ○○ area". Further, the user may input conditions regarding the recommendation rank, the genre of desired stores, the distance from the current position, and the like to the terminal device 16, and display only the information of stores meeting the conditions.

In the description so far, the information providing device 10 executes the calculation of the characteristic action amount and the leader point. However, other methods can also be used. For example, the terminal device 16 exchanges the position information with the terminal device 16 in the vicinity at any time, and forms a group, using its own position information and position information of the another terminal device 16. Further, the terminal device 16 may calculate the characteristic action amounts and the leader points for the terminal devices 16 included in the group. That is, the position information manager 22 and the group information processor 24 may be included in the terminal device 16. Each of the terminal devices 16 in the group may calculate only its own leader point or a specific terminal device 16 may collectively calculate the leader points of a plurality of terminal devices 16. Further, the terminal device 16 that has calculated the leader point transmits the leader point to the information providing device 10. The item selector 26 and the transmitter 32 of the information providing device 10 execute similar processing on the basis of the received leader point and select an appropriate item for the group.

Further, as described above, the point calculator 42 calculates the leader point, using the latitude and longitude information of the terminal device 16 stored in the position information manager 22. However, other methods may be used. For example, an image/video of a surveillance camera installed in a shopping mall or a shopping street may be analyzed, the group forming unit 40 may execute processing of forming a group, using image recognition technique, and the point calculator 42 may execute processing of updating the leader point. In this case, to receive the recommendation information, it is sufficient that at least one user in the group has the terminal device 16, and all the members of the group do not need to carry the terminal device 16. Further, the latitude and longitude information is not necessarily required, and a relative positional relationships of users in the group and relative movement information may just be acquired. In addition, which person's leader point is high and which person's leader point is low at the entry to the store can be grasped by a store clerk by using a face recognition technique in cooperation with a surveillance camera installed in a shopping mall or a passage in a shopping street and a surveillance camera installed at a store entrance. With such information, improvement and efficiency of customer service, such as preferentially providing a menu or a wine list to a person having a high leader point, can be achieved.

Further, the point calculator 42 may acquire a group action history in the store and estimate the influence on product selection. For example, the point calculator 42 may perform processing of specifying a user who arrives first at a shelf of a product, which has been purchased by a user, and adding a point to the user arrived, to calculate the leader point (influence value) pertaining to the product selection. That is, the object to be selected is not limited to a store, and the leader point (influence value) pertaining to selection (choice) of an item including a product or the like is calculated.

According to the present embodiment, a group is formed on the basis of the time series data of the position information, and thus a plurality of subjects acting together can be grouped. Also, the grouping is automatically performed, and thus convenience for users can be improved. Further, a leader point is calculated after calculating a characteristic action amount that indicates the degree of being matched with a predetermined action pattern in which influence of a subject in the group is high, on the basis of the time series data of the position information, and thus the leader point in consideration of the influence of the user in the group can be derived. Further, an item to be presented to the group is selected such that a subject having a high leader point is prioritized, and thus an item in consideration of the influence of the user in the group can be selected.

Further, at least one of the number of times, the time, the moving distance, the probability, of the moving pattern of a subject in the time series data of the position information being matched with the predetermined action pattern, is calculated as the characteristic action amount, and thus the characteristic action amount matched with the action pattern can be derived. Further, the leader point is calculated such that a higher value is obtained as the characteristic action amount is larger, and thus the leader point matched with the action pattern can be derived. Further, the predetermined action pattern is a pattern in which the subject is positioned at a predetermined rank from the head of the group with reference to the moving direction of the group. Therefore, the influence of the user according to the position where the user in the group exists can be estimated with high accuracy. Further, the leader point is calculated such that a value becomes higher as the predetermined rank is higher, and thus the influence of the user existing at the head of the group can be estimated to be large.

Further, the predetermined action pattern is a pattern in which a subject moves from the time of division in the moving direction after join in a case where the group is divided into a plurality of groups and the groups are joined, and thus the influence of the user can be estimated with high accuracy. Further, the leader point is calculated on the basis of the number of subjects included in the small group when the group is divided into a plurality of groups, and thus the magnitude of the influence can be estimated with high accuracy. Further, the predetermined action pattern is a pattern in which, in a case where a subject stops, another subject also stops following the stop, and thus the influence of when the subject stops can be estimated. Further, the leader point is calculated on the basis of the number of another subjects that has stopped following the stop, and thus the magnitude of the influence can be estimated with high accuracy. Further, the leader point is calculated according to the number of subjects included in the group, and thus the magnitude of the influence can be estimated with high accuracy.

Further, the degree of recommendation for an item in the group is derived by registering, while weighting with the leader point, the degree of preference for the item in the user corresponding to each subject, and the item is selected according to the degree of recommendation. Therefore, the item in consideration of the influence of the user can be selected for the group. Further, the degree of preference for an item attribution in the group is derived by registering, while weighting with the leader point, the degree of preference for the item attribute in the user corresponding to each subject. Therefore, the degree of preference in consideration of the influence of the user can be derived for the group. Further, an item is selected on the basis of the degree of preference for the item attribute in the group, and thus the item in consideration of the influence of the user can be selected for the group from a larger number of recommendation candidates. Further, a predetermined number of subjects is specified in descending order of the calculated leader points, and the item is selected on the basis of the leader points of the specified subjects, and thus the item in consideration of the predetermined number of subjects having great influence can be selected. Further, by considering the influence of the user in the group, information leading to an actual action can be provided with higher accuracy than a method in which the influence of the user in the group is equal. Further, the influence can be estimated only from the position information of the terminal device even when information regarding the influence of the user in the group is not added.

Second Embodiment

Next, a second embodiment will be described. The second embodiment relates to an information providing system including a plurality of terminal devices and an information providing device connectable to the terminal devices, similarly to the first embodiment. The information providing device according to the second embodiment forms a group, using position information of the plurality of terminal devices, and estimates influence of users in the group, and further uses attribute information of the users in estimating the influence of the users. An information providing system 100 and a terminal device 16 according to the second embodiment are of similar types to those in FIGS. 1 and 13. Here, differences will be mainly described.

Figure 15:
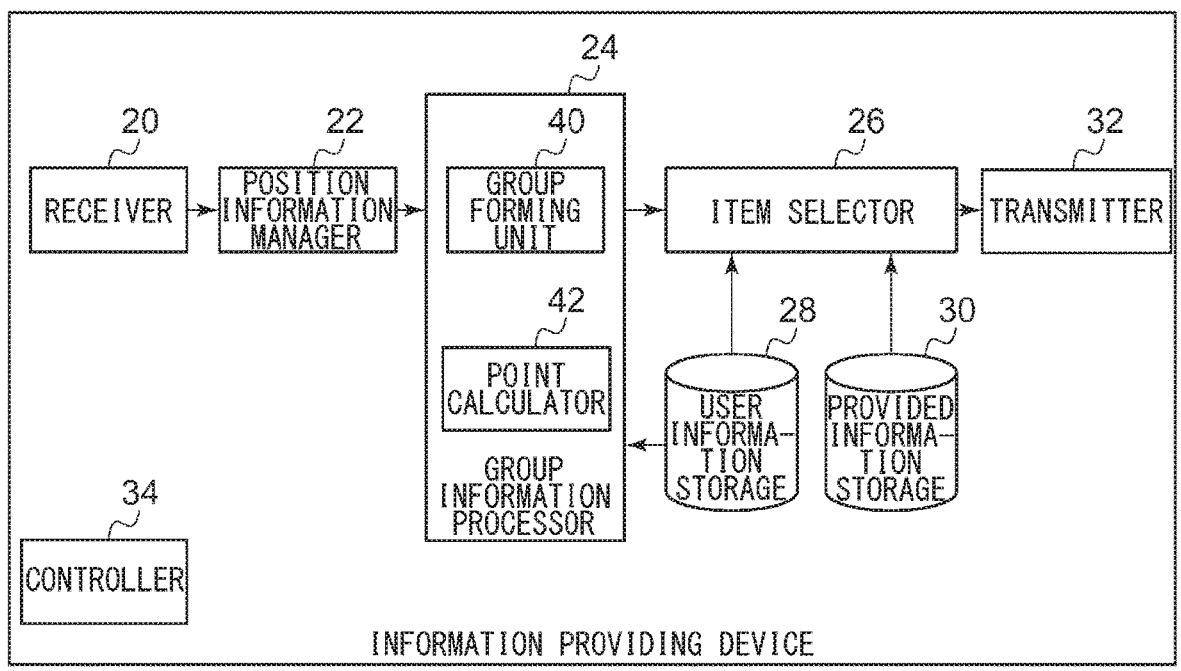
FIG. 15 is a diagram illustrating a configuration of an information providing device according to a second embodiment.

FIG. 15 illustrates a configuration of an information providing device 10 according to the second embodiment. The information providing device 10 is similarly structured to FIG. 2. However, a group information processor 24 is structured to be able to refer to a database stored in a user information storage 28 A point calculator 42 calculates a leader point by estimating influence within a group, using not only position information but also attribute information (age, sex, etc.) of a user corresponding to a subject. The user information storage 28 stores the user attribute information. FIG. 16 illustrates a data structure of a database stored in the user information storage 28. User attribute items such as a terminal ID (or a user ID) and a birth date, a gender, a work place, a position, an annual income, an allowance of this month, etc. are stored in association with one another. This is only an example, and data of other user attribute items may be stored or only some of the attribute items may be stored. Referring back to FIG. 15.

The point calculator 42 in the first embodiment has calculated the leader point based on the position information. However, the point calculator 42 in the second embodiment calculates the leader point based on the user attribute information. Furthermore, the point calculator 42 calculates an overall leader point, using two leader points. Hereinafter, the leader point based on the position information of a terminal device i is Pg[i], the leader point based on the user attribute information is Ph[i], and the overall leader point is P[i]. The point calculator 42 calculates the leader point Ph[i] based on the user attribute information by the following method.

The first method is a method of calculating a leader point on the basis of a rule set for each user attribute item. For example, in general, the influence of an elder user is high, and thus Ph[i] can be calculated on the basis of the birth date. Specifically, the point calculator 42 gives a larger leader point as the age is higher on the basis of the birth date of the user in the group. For example, the point calculator 42 gives a leader point of "10" to the eldest user, "7" to the second eldest user, and "5" to the third eldest user. Further, the point calculator 42 may give a leader point with a value larger than 0 and smaller than or equal to 1 according to the age, where the maximum value of the leader point to be given is 1. Further, the point calculator 42 may insert a rule to give the same leader point, ignoring the age difference, in a case where a person having an age difference that is smaller than or equal to a predetermined value from a person in a one-different age rank.

Further, the point calculator 42 may use a rule to give a larger leader point as the position is higher. For example, the point calculator 42 gives a leader point of "10" to the president, "5" to the manager, and "2" to the section chief. Further, the point calculator 42 may calculate the leader point according to the annual income or the allowance of this month. For example, since a person with a higher annual income tends to have greater influence, a value obtained by multiplying the annual income by a predetermined coefficient (0.1% etc.) can be set to Ph[i]. Further, the point calculator 42 may give the leader point such as "10" to a person with the highest annual income and "8" to the second highest person, and may set a predetermined leader point according to the rank of the annual income. The same applies to the allowance of this month. Since the allowance of this month may accurately represent a spendable amount in a restaurant or the like by a person, the influence may be able to be more accurately estimated than using the annual income. Further, the point calculator 42 may calculate the leader point on the basis of the gender.

The second method is a method of adding a leader point calculated for each user attribute item, using a plurality of user attribute items. That is, the point calculator 42 calculates the leader point on the basis of a plurality of items included in the attribute information of the user. First, the point calculator 42 calculates a leader point Ph[1][i] regarding the birth date, using the rule "the leader point becomes higher as the age is higher" described in the first method. Next, the point calculator 42 calculates a leader point Ph[2][i] regarding the position, using the rule "the leader point becomes higher as the position is higher" described in the first method. In this way, the point calculator 42 calculates Ph[l] [i] (l=1 to L, and i=1 to N) for L user attribute items, and calculates a leader point Ph[i] based on the user attribute information as follows. Here, w[l] (l=1 to L) is a predetermined weighting factor determined for each user attribute item, and w[l]>0.

[Expression 4]

$$Ph[i] = \sum_{l=1}^{L} w[l] Ph[l][i] \quad (4)$$

The third method is a method of calculating a leader point on the basis of a rule set using a combination of a plurality of user items. For example, the point calculator 42 calculates the leader point of the user whose birth date falls within a predetermined range and having a predetermined gender to be relatively high. For example, a woman in a certain age group tends to have a high request level to restaurants, and thus a predetermined leader point is given to the user whose birth date falls within a predetermined range and having the gender of female so that the preference of such a user can be more easily reflected in decision making of the group. The third method may be used alone or in combination with another method. For example, the point calculator 42 first calculates the leader point according to the expression (4) and then may perform processing of adding the leader point of "10" to the user whose birth date falls within a predetermined range and having a predetermined gender.

The fourth method is a method using a rule in consideration of an organization to which the user belongs. At that time, the point calculator 42 refers to information stored in the user information storage 28. FIG. 17 illustrates a data structure of another database stored in the user information storage 28. This indicates a business relationship between companies. FIG. 17 illustrates a situation in which X company places an order to Y company and Y company places an order to Z company. Typically, a person in the company that has accepted the order chooses a store such as a restaurant according to the preference of a person in the orderer company, such tendency is reflected in the leader point. In the example illustrated in FIGS. 16 and 17, the leader point of the user of the work place=X is the highest, the leader point of the user of the work place=Y is next high, and the leader point of the user of the work place=Z is the lowest. When there is a plurality of users working for the same company, the leader points of the users may be set to the same value, or a difference may be given to the leader points, using the attribute item such as the birth date, the gender, or the position.

The fifth method is a method using a relationship between the birth date, and month and day (current date and time) when processing is performed. For example, in a case where the date when calculating the leader point is May 3, 2015, and a user with the birth date of May 3, 1979 exists in the group, the user's birthday party or the like may be held. Therefore, the point calculator 42 calculates the leader point of the user higher than usual. That is, the point calculator 42 calculates the leader point of the user whose birth day corresponds to or is close to the date when processing is performed to be relatively high. In this manner, the point calculator 42 calculates the leader point according to the relationship between the date when processing is executed and the attribute information of the user.

The sixth method is a method using a relationship between the gender and the month and day (current date and time) when processing is performed. For example, in a case where the current date when calculating the leader point is White Day on Mar. 14, 2015, a man may choose a restaurant according to the preference of a woman. Therefore, the point calculator 42 calculates the leader point of the woman higher than usual. Note that the point calculator 42 may use any one of the above-described first to sixth methods alone or may use a plurality of the methods in combination.

Next, the point calculator 42 calculates the overall leader point P[i] as follows.

[Expression 5]

$$P[i] = \alpha 1 \times Pg[i] + \alpha 2 \times Ph[i] \quad (5)$$

Here, the leader point based on the position information of a terminal device i described in the first embodiment is Pg[i] (the leader point is described as P[i] in the first embodiment), and the leader point based on the user attribute information is Ph[i]. Further, $\alpha 1$ and $\alpha 2$ are predetermined coefficients satisfying $\alpha 1 > 0$ and $\alpha 2 > 0$. That is, the point calculator 42 executes weighted addition of the leader point based on the position information and the leader point based on the user attribute information. Note that the sum (addition value) of the leader point based on the position information and the leader point based on the user attribute information may be set to the overall leader point, using $\alpha 1 = 1$ and $\alpha 2 = 1$.

Further, the point calculator 42 may calculate the overall leader point P[i] as follows.

[Expression 6]

$$P[i] = Pg[i]^{\gamma 1} \times Ph[i]^{\gamma 2} \quad (6)$$

Here, $\gamma 1$ and $\gamma 2$ are predetermined numbers satisfying $\gamma 1 > 0$ and $\gamma 2 > 0$. That is, a product (multiplication value) of a power value having Pg[i] as a radix and γ1 as an exponent and a power value having Ph[i] as a radix and γ2 as an exponent is P[i]. To strongly reflect Pg[i] in Ph[i], γ1 is set to be a large value. To strongly reflect Ph[i] in Ph[i], γ2 is set to be a large value. Note that the product (multiplication value) of the leader point based on the position information and the leader point based on the user attribute information may be set to the overall leader point, using γ1=1 and γ2=1. After the point calculator 42 calculates the overall leader point P[i] on the basis of the expression (5) or (6), processing similar to the first embodiment may just be executed. That is, P[i] calculated based on the expression (5) or (6) is substituted into the expression (1).

According to the present embodiment, the leader point is calculated according to the attribute information of the user corresponding to a subject, and thus the estimation accuracy of the influence of the user in the group can be improved. Further, the leader point is calculated on the basis of the plurality of items included in the attribute information of the user, and thus the estimation accuracy can be improved. Further, the leader point is calculated according to the relationship between the date when the processing is executed and the attribute information of the user, and thus the influence can be estimated in consideration of the date when the processing is executed.

Third Embodiment

Next, a third embodiment will be described. The third embodiment relates to an information providing system including a plurality of terminal devices and an information providing device connectable to the terminal devices, similarly to the embodiments so far. Therefore, the information providing device according to the third embodiment forms a group, using position information of a plurality of terminal devices, and estimates influence of users in the group, similarly to the second embodiment. The third embodiment assumes a case in which a group is a family. An information providing system 100, a terminal device 16, and an information providing device 10 according to the third embodiment are of similar types to those in FIGS. 1, 13, and 15. Here, differences will be mainly described.

A group forming unit 40 in FIG. 15 changes conditions for forming a group according to attribute information of a user corresponding to a subject. The attribute information of the user is stored in a user information storage 28. FIG. 18 illustrates a data structure of another database stored in the user information storage 28 according to the third embodiment. As illustrated in FIG. 18, terminal IDs are added in units of families. Referring back to FIG. 15. In a case where the terminal IDs are added in units of families, the group forming unit 40 relaxes a condition to determine these terminal devices 16 as one group, as compared with a usual case. For example, in a case of determining the terminal devices 16 existing within a predetermined distance for larger than or equal to a predetermined time as one group, the group forming unit 40 makes a threshold value of the distance between terminals longer than usual or making the predetermined time shorter than usual. Processing is based on the assumption that family members are likely to act together toward a common destination. For example, in the course of heading to a destination, even if a child temporarily leaves away, it is possible to maintain appropriate determination as a group action and provide appropriate information.

The point calculator 42 performs processing of making a leader point based on position information of a child in a predetermined age or less (for example, an elementary school kid or less) lower than the parents, using a birth date and a family relation added in the database illustrated in FIG. 18. For example, even if the number of times of the child being positioned at the head of the group is large, the point calculator 42 performs processing of less reflecting the number of times in the leader point based on the position information. Specifically, the point calculator 42 performs control processing of multiplying the number of times of measurement of a head position by 0.1, and setting an upper limit to the number of times of the head position to be used for leader point calculation, for the terminal device 16 of a child in a predetermined age or less. Small children often impulsively and suddenly act. With such control processing, the leader point based on the position information can be calculated with accuracy.

Further, the point calculator 42 may perform processing of making the leader point of the mother largest because the influence of the mother at home is typically greatest. Further, the point calculator 42 may calculate the leader point, using a relationship between a date (current date and time) when processing is performed and the family relation. For example, in a case where the current date and time when the leader point is calculated is Jun. 21, 2015, and corresponds to Father's Day, the point calculator 42 may calculate the leader point of the father higher than usual.

According to the present embodiment, the conditions for forming the group are changed according to the attribute information of the user corresponding to a subject, and thus the group suitable for the circumstances of the family or the like can be formed. Further, the leader point is calculated according to the family structure, and thus the influence in the family can be estimated with high accuracy.

Fourth Embodiment

Next, a fourth embodiment will be described. The fourth embodiment relates to an information providing system including a plurality of terminal devices and an information providing device connectable to the terminal devices, similarly to the embodiments so far. Therefore, the information providing device according to the fourth embodiment forms a group, using position information of a plurality of terminal devices, and estimates influence of users in the group, similarly to the embodiments so far. The common information has been provided to the users in the group so far. However, in the fourth embodiment, a plurality of sub groups is formed in one group, using at least one of position information, user preference information, and user attribute information, and appropriate information is provided to each of the sub groups. An information providing system 100, a terminal device 16, and an information providing device 10 according to the fourth embodiment are of similar types to those in FIGS. 1, 13, and 15. Here, differences will be mainly described.

A group forming unit 40 in FIG. 15 forms at least two sub groups by classifying a plurality of subjects included in a group into at least two sub groups. As described above, the group forming unit 40 calculates matrix data indicating an average distance between terminals as illustrated in FIG. 5 on the basis of position information stored in a position information manager 22. The group forming unit 40 forms sub groups, using this matrix data. The group forming unit 40 performs processing of setting a predetermined threshold value for forming sub groups, and causing terminal devices having an average distance between terminals being the threshold value or less to correspond in the same sub group.

For example, a condition of a subgroup threshold value=3 m is applied to a group including a first terminal device 16a to a fifth terminal device 16e. In that case, two sub groups including a sub group 1 including the first terminal device 16a, the second terminal device 16b, and the third terminal device 16c, and a sub group including the fourth terminal device 16d and the fifth terminal device 16e are created.

Apart from this, a method of forming sub groups, using the user preference information, by the group forming unit 40 will be described. User preference information (the degree of preference) F[i][j] as illustrated in FIG. 10 is stored in the user information storage 28 (i=1 to N and j=1 to M). This is a numerical value indicating the strength of the preference for a food category j of a terminal device i (corresponding to a user i). The group forming unit 40 calculates the degree of matching of the preference between two terminal devices 16 (two users) according to the following cosine similarity.

[Expression 7]

$$E[i][p] = \frac{\sum_{j=1}^{M} F[i][j]F[p][j]}{\sqrt{\sum_{j=1}^{M} F[i][j]^2} \sqrt{\sum_{j=1}^{M} F[p][j]^2}} \quad (7)$$

Here, E[i][p] is the degree of similarity regarding the preference of the terminal device i and a terminal device p, and indicates that the preferences of both the terminal devices are further matched as the numerical value is larger. Here, i=1 to N, p=1 to N, and i≠p.

Alternatively, the group forming unit 40 may calculate the degree of similarity E[i][p] between the terminal device i and the terminal device p according to the following correlation coefficient.

[Expression 8]

$$E[i][p] = \frac{\sum_{j=1}^{M} (F[i][j] - Fa[i])(F[p][j] - Fa[p])}{\sqrt{\sum_{j=1}^{M} (F[i][j] - Fa[i])^2} \sqrt{\sum_{j=1}^{M} (F[p][j] - Fa[p])^2}} \quad (8)$$

Here, Fa[i] is an average value of the preference information F[i][j] corresponding to the terminal device i, and Fa[p] is the preference information F[p][j] corresponding to the terminal device p. E[i] [p] by the expression (8) takes a value in a range of −1 to +1, and becomes a larger value as the preferences of the terminal device i and the terminal device p are further matched, similarly to the expression (7). Further, the degree of similarity regarding the preference between two terminal devices 16 may be calculated by a method other than the above method. For example, a reciprocal of the distance (Euclidean distance or the like) between the preference information of the terminal device i and the preference information of the terminal device p may be used as the degree of similarity. In this way, the group forming unit 40 calculates the degree of similarity between the terminal devices 16 in the group, and collectively sets the terminal devices having the degree of similarity being larger than or equal to the predetermined threshold value to the sub group.

Furthermore, apart from these, a method of forming sub groups, using the user attribute information will be described. A first method of creating a sub group from the user attribute information is a method of setting the terminal devices 16 having the same user attribute item to a sub group. For example, in the case of the user attribute information illustrated in FIG. 16, the group forming unit 40 forms three sub groups X, Y, and Z for the work place. Further, the group forming unit 40 may form a sub group by grouping people whose position levels are the same or close. For example, sub groups such as executive director, department manager, section chief, chief, and general (general staff) may be formed. Further, the group forming unit 40 may form sub groups by age group. For example, sub groups such as teens, 20's, 30's, 40's, 50's, and 60's may be formed. Further, the group forming unit 40 may form sub groups by annual income. For example, sub groups may be formed on the basis of a predetermined annual income range such as three to four million yen, four to five million yen, and five to six million yen.

A second method of creating a sub group from the user attribute information is a method of calculating the degree of similarity between the terminal devices 16 pertaining to the user attribute information. As illustrated in FIG. 16, user attribute information G[i][l] of an attribute item 1 is stored in the terminal device i (i=1 to N and l=1 to L). The group forming unit 40 calculates the degree of similarity Q[i][p] (i≠p) between the terminal device i and the terminal device p pertaining to the user attribute information as follows.

[Expression 9]

$$Q[i][p] = \frac{\sum_{l=1}^{L} \delta(G[i][l], G[p][l])}{L} \quad (9)$$

Here, the δ function is typically a function that returns "1" when two arguments are matched and "0" when different. A δ function with different response characteristics may be used depending on the attribute item. For example, in a case where the attribute item is a nominal scale such as the gender, work place, or the like, a function that returns "1" only when two arguments are completely matched is used. Meanwhile, in a case where the attribute item is a numerical value (interval scale or proportional scale) such as the annual income or allowance of this month, a function that returns "1" when a relative difference between two arguments is less than or equal to 10%, and "0" in other cases is used.

Alternatively, a function that returns "1" when two arguments are completely matched, "0.8" when an error is within 5%, "0.5" when an error is 5 to 10%, "0.2" when an error is 10 to 20%, and "0" when an error is larger than or equal to 20% may be used. After calculating the degree of similarity Q[i][p] (i=1 to N, p=1 to N, and i≠p) pertaining to the user attribute information, the group forming unit 40 collectively sets the terminal devices 16 having the degree of similarity being larger than or equal to a predetermined threshold to a sub group. Still further, the group forming unit 40 may create a sub group in combination of the above-described methods. For example, the group forming unit 40 may create a sub group, using all the three pieces of information: the position information, the user preference information, and the user attribute information.

After the sub group is created in this manner, the item selector 26 creates recommendation information for each sub group. That is, the item selector 26 executes processing for the sub group, corresponding to the processing for the group. This corresponds to selecting an item to be presented to each of sub groups such that a subject having a high leader point calculated in the point calculator 42 is prioritized. The recommendation information created for one sub group may be provided only to the terminal devices 16 belonging to the sub group or may be provided to the terminal devices 16 belonging to the another sub group (all the terminal devices 16 in the another group).

According to the present embodiment, the plurality of subjects included in the group is classified into at least two sub groups, to form at least two sub groups. Therefore, subjects having the degree of similarity in the group can be grouped into the sub groups. Further, an item to be presented to each of the sub groups is selected such that a subject having a high leader point is prioritized. Therefore, an item can be presented to each sub group. Further, in a case where there is no store that all the members in the group can enter, the group may be divided into two or more sub groups, and an available store may be presented to each sub group. Since each sub group is composed of members having a relatively high degree of similarity with respect to at least one of the user action, the user preference, and the user attribute, communication between users can be easily obtained and the convenience and satisfaction of the user can be enhanced.

Fifth Embodiment

Next, a fifth embodiment will be described. The fifth embodiment relates to an information providing system including a plurality of terminal devices and an information providing device connectable to the terminal devices, similarly to the embodiments so far. Therefore, the information providing device according to the fifth embodiment forms a group, using position information of a plurality of terminal devices, and estimates influence of users in the group, similarly to the embodiments so far. An item has been selected on the basis of the influence of each of the users in the group so far. In the fifth embodiment, information indicating influence of each of users in a group is provided. An information providing system 100 and a terminal device 16 according to the fifth embodiment are of similar types to those in FIGS. 1 and 13. Here, differences will be mainly described.

Figure 19:
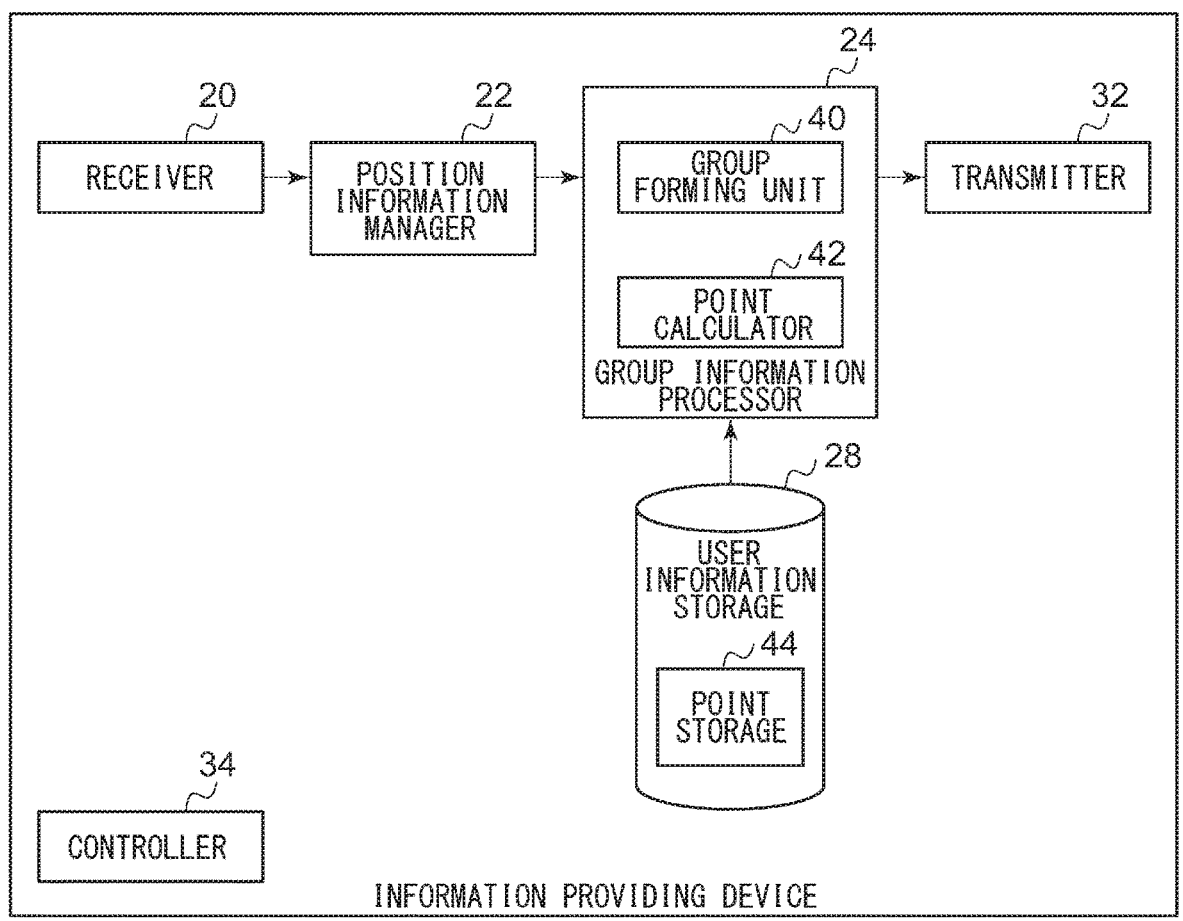
FIG. 19 is a diagram illustrating a configuration of an information providing device according to a fifth embodiment.

FIG. 19 illustrates a configuration of an information providing device 10 according to the fifth embodiment. The information providing device 10 includes a receiver 20, a position information manager 22, a group information processor 24, a user information storage 28, a transmitter 32, and a controller 34. Further, the group information processor 24 includes a group forming unit 40 and a point calculator 42, and the user information storage 28 includes a point storage 44. The information providing device 10 so far has provided the store information and the like based on the position information to the terminal devices 16 belonging to the group as the recommendation information. The information providing device 10 in the fifth embodiment provides information indicating influence of users in a group. That is, the point calculator 42 calculates a leader point for each terminal device 16, and the transmitter 32 transmits the leader point calculated in the point calculator 42 or an index of an aggregation of the leader points to each of the terminal devices 16. Note that the transmission destination is not limited to the terminal devices 16 in the group, and may be other terminal devices 16 and other devices (for example, a marketing data analysis system or the like).

Meanwhile, the transmitter 56 of the terminal device 16 illustrated in FIG. 13 receives the leader point or the index of an aggregation of the leader points from the information providing device 10. The controller 54 performs control to cause a display 52 to display the data received in the transmitter 56. Note that, in a case where the received data is display data, the controller 54 of the terminal device 16 controls the display 52 according to the received data. Further, in a case where the received data is material data, the controller 54 of the terminal device 16 creates display data on the basis of the received data, and causes the display 52 to display the display data.

Figure 20:
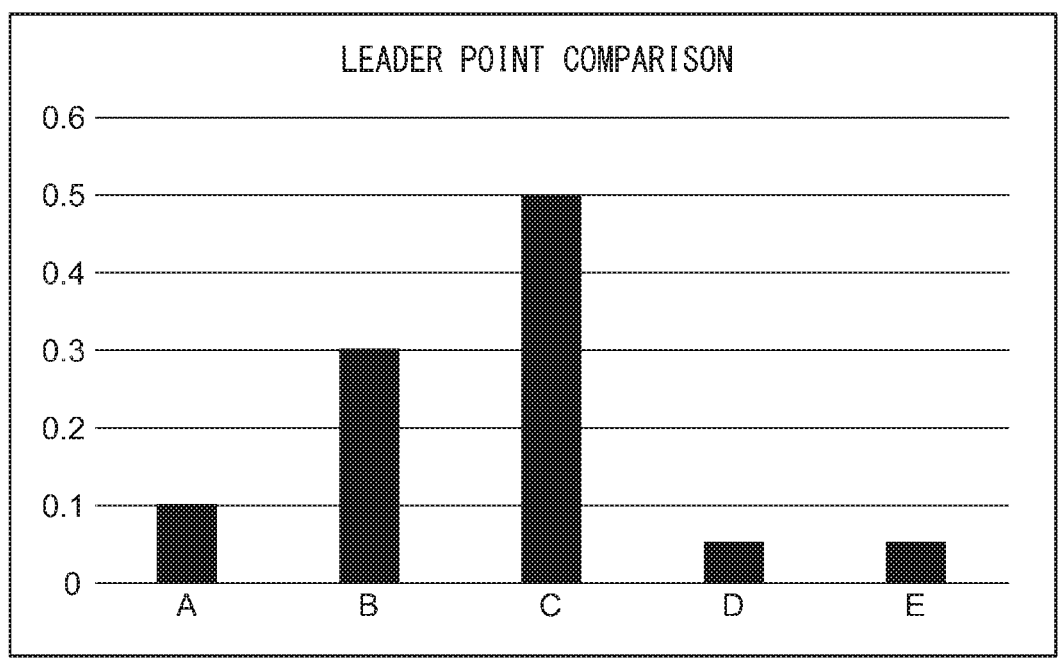
FIG. 20 is a diagram illustrating a screen displayed on a display according to a fifth embodiment.

FIG. 20 illustrates a screen displayed on the display 52 according to the fifth embodiment. This corresponds to an example of display of the leader points in the terminal device 16. In the example illustrated in FIG. 20, the respective leader points of the five terminal devices 16 that actually form one group are displayed. A, B, C, D, and E on the horizontal axis represent terminals ID given to the terminal devices 16 in the group. As described above, A, B, C, D, and E correspond to a first terminal device 16a, a second terminal device 16b, a third terminal device 16c, a fourth terminal device 16d, and a fifth terminal device 16e. Further, the vertical axis represents the leader point. As illustrated in FIG. 20, the leader point of the third terminal device 16c is the highest, and the second terminal device 16b is the second highest. Further, in this example, values normalized such that the sum total of the leader points in the group becomes "1" are used. However, the sum total may be set to "100" or a maximum value may be set to a predetermined value (for example, 100).

Figure 21:
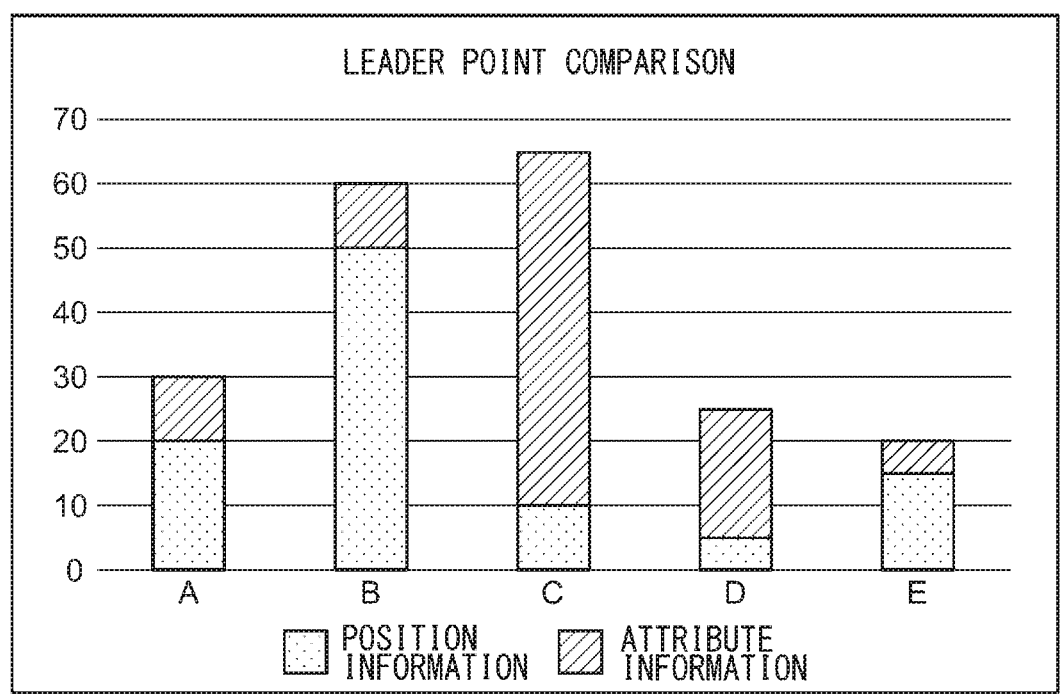
FIG. 21 is a diagram illustrating another screen displayed on the display according to the fifth embodiment.

FIG. 21 illustrates another screen displayed on the display 52 according to the fifth embodiment. This corresponds to another example of the leader point display. Here, a leader point Pg based on the position information is illustrated by the dot pattern, and a leader point Ph based on the user attribute information is illustrated by the diagonal line pattern. With such display, the leader points of the users can be expressed in more detail. For example, the leader point of the third terminal device 16c followed by the leader point of the second terminal device 16b are large. However, configurations of both the terminal devices are substantially different. While the leader point based on the user attribute information is large in the third terminal device 16c, the leader point based on the position information is large in the second terminal device 16b. In this example, the leader point is a sum (addition value) of Pg and Ph, and normalization is performed such that the total sum of Pg becomes "100" and the total sum of Ph becomes "100" in the group.

Figure 22:
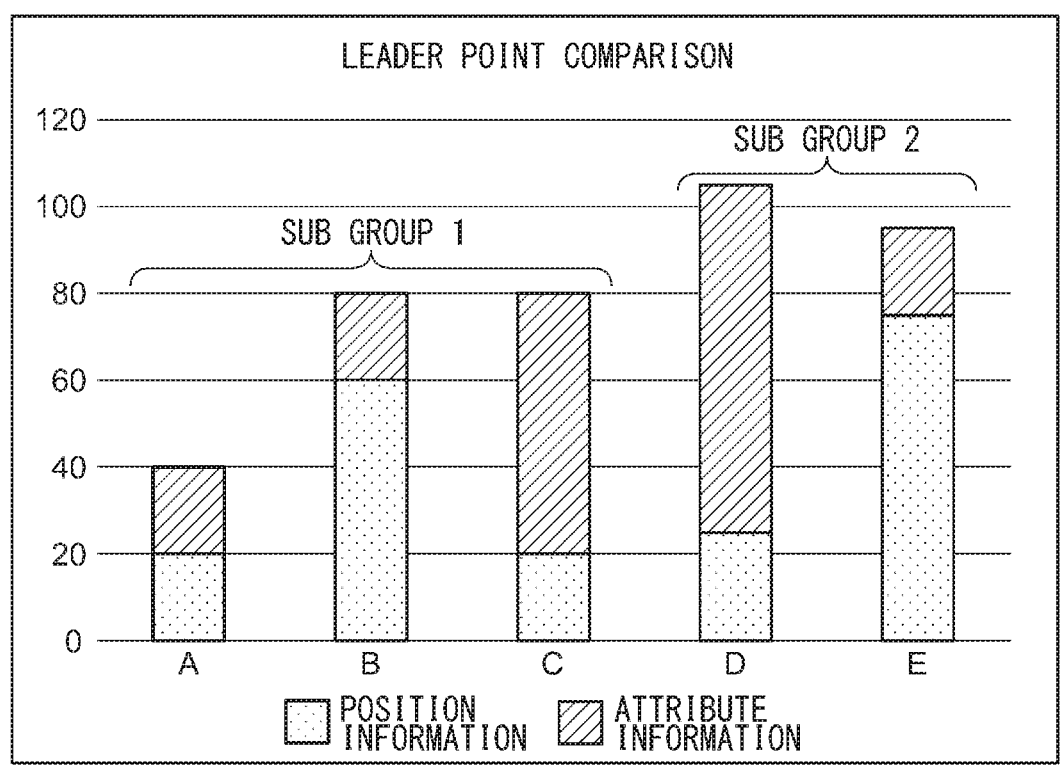
FIG. 22 is a diagram illustrating another screen displayed on the display according to the fifth embodiment.

FIG. 22 illustrates another screen displayed on the display 52 according to the fifth embodiment. This corresponds to an example of leader point display when sub groups are formed. In this example, the first terminal device 16a, the second terminal device 16b, and the third terminal device 16c correspond to a sub group 1, and the fourth terminal device 16d and the fifth terminal device 16e correspond to a sub group 2. Pg and Ph are normalized such that respective total sums in the sub groups become "100". Referring back to FIG. 19.

Data related to the leader points calculated in the point calculator 42 may be based on an action history in selecting a store or the like once, or it may be based on a plurality of action histories. The leader point in one group action can be said to be a short-term leader point. Further, the value (index) obtained by aggregating (collecting) leader points in a plurality of times of group actions can be said to be a long-term leader point. To provide the long-term leader point, the point storage 44 stores the leader point calculated in the past by the point calculator 42 in association with each subject. FIG. 23 illustrates a data structure of a database (point history table) stored in the point calculator 42 according to the fifth embodiment. The point history table stores point history data in which a group ID, a terminal ID, a calculated date and time, a leader point, a store ID, and a purpose classification in association with one another. As described above, the group ID is an ID uniquely identifying the group, and a new group ID is allocated every time a group is generated. The purpose classification is information indicating a destination such as a store selected by the group or a purpose of the action.

For example, "meal", "shopping", "drinking", "theme park", etc. can be used as information indicating a rough purpose. That is, the purpose classification is classification corresponding to a superordinate concept of a store genre (a more abstract concept). Further, as more detailed destinations, for example, classification (store genres) such as "Japanese restaurant", "French restaurant", "Chinese restaurant", "izakaya", "bar", "clothes store", "general store", "book store", "record store", and "florist" can be used. Note that the group having reached the destination can be determined under a condition that the position information of each of the terminal devices 16 in the group is substantially unchanged for a predetermined time (for example, five minutes) or more, as described above. Further, by searching a store database or the like using the position information, information of stores (a genre or the like) can be acquired, and thus the information can be used for purpose classification. Further, a questionnaire survey inquiring about the purpose of the action of this time may be transmitted to the terminal device of the group at appropriate timing when the group has arrived at the destination, or the like, and information obtained by collecting the questionnaire survey may be used for the purpose classification. By use of such a point history table, the leader points may be compared by a combination of arbitrary terminal devices 16 that do not actually act as the same group.

The point calculator 42 calculates an index of an aggregation of a plurality of leader points corresponding to one subject, targeting data with the calculation date and time corresponding to a predetermined period (for example, 2015/01/01 to 2015/01/31) by reference to the point storage 44. More specifically, the point calculator 42 calculates indexes such as a total value of the leader points for each terminal ID, a representative value (an average value, a median, a mode), a maximum value, a minimum value, and a value indicating variation (standard deviation, dispersion, and (the maximum value-the minimum value)). Further, the point calculator 42 may calculate an index obtained by aggregating the leader points for each terminal ID for each purpose classification (category). That is, the point calculator 42 may calculate at least one of the frequency for each category and the relative frequency for each category as an index. Since the number of times of calculation of the leader point within the predetermined period is different for each terminal device 16, the average value or the median is more suitable than the total value to perform comparison between the terminal devices 16.

Further, the point calculator 42 may correct the leader point according to the number of people in the group. In a case where normalization is performed such that the sum total of the leader points becomes 1 in one group, an average value (expected value) of the leader point per person becomes smaller as the number of people in the group is larger. Even in a case where normalization is not performed, the frequency of each user being positioned at the head becomes smaller as the number of people in the group is larger, and thus the leader point per person tends to be small. Therefore, the point calculator 42 performs correction processing of increasing the value of the leader point or the like in a case where the number of people in the group is large. For example, the number of people is calculated for each group ID, and when the number of people of a certain group ID is larger than or equal to a third predetermined value and less than a fourth predetermined value, the leader point corresponding to the group ID is made "1.5 times". Further, when the number of people of a certain group ID is larger than or equal to the fourth predetermined value, processing of "doubling" the leader point corresponding to the group ID or the like is performed. Further, an index of an aggregation of the leader points is calculated using the corrected leader points.

Figure 24:
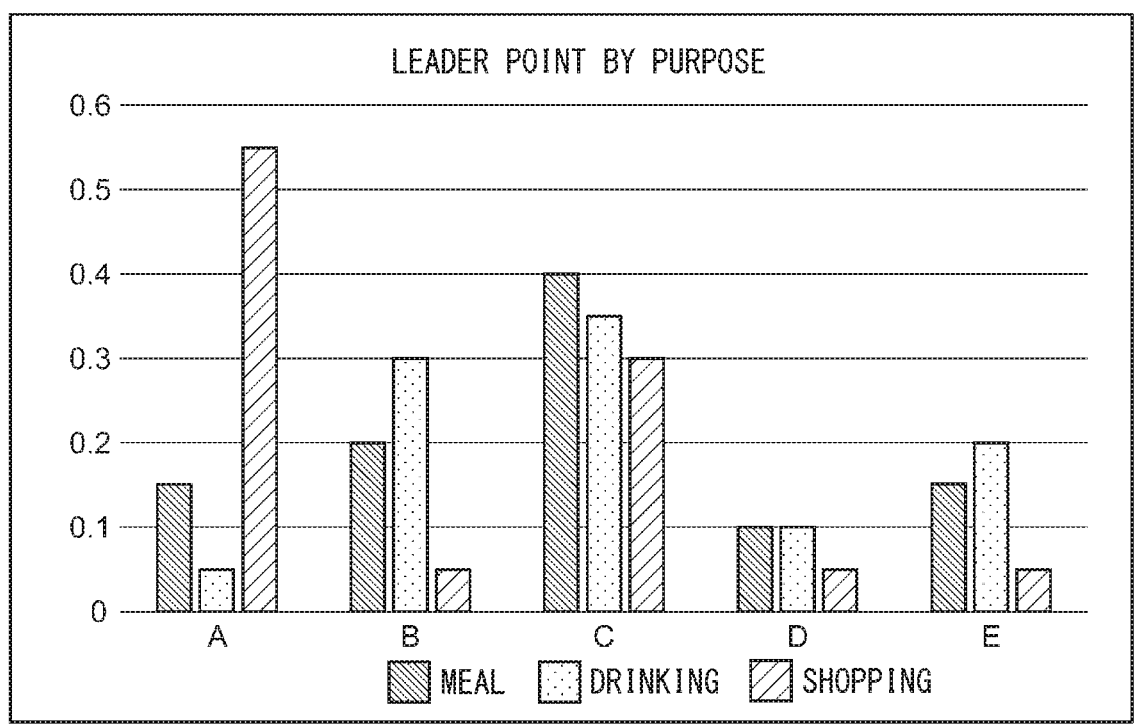
FIG. 24 is a diagram illustrating another screen displayed on the display according to the fifth embodiment.

FIG. 24 illustrates another screen displayed on the display 52 according to the fifth embodiment. This corresponds to an example of displaying leader points by purpose classification. Three purpose classifications of "meal", "drinking" and "shopping" are used. The leader points illustrated here are values obtained by calculating average values by purpose classification of leader points obtained by each of the terminal devices for a predetermined period (average values of each combination of the terminal device and the purpose classification), and performing normalization such that a total of the average values of each terminal device becomes "1", in the point calculator 42. That is, the point calculator 42 can be said to calculate the index by purpose of action of the group, by category of an item selected by the group, or by genre. In the example illustrated here, for example, it can be read that the influence is small in the scenes of "meal" and "drinking" but strong influence is exerted in the scene of "shopping" regarding the first terminal device 16a. Further, it can be read that comparatively strong influence is exerted in any scene regarding the third terminal device 16c. Note that the first terminal device 16a to the fifth terminal device 16e described here may be the terminal devices 16 that has actually acted as one group, or may be comparison of gathered terminal devices 16 that do not actually act as one group. That is, the user may specify a combination of arbitrary terminal devices 16 (users) and display the leader points. For example, the user can specify his/her own family and friends and display their leader points in a comparable manner. Further, each user may specify in advance whether disclosing his/her own leader points, information to be disclosed, and conditions of parties to which the information is disclosed, and store the information to the information providing device 10. Disclosure to other users may be controlled according to the information. Further, the user may arbitrarily select a group formed in the past and display the leader points of the terminal devices 16 constituting the group in a comparable manner. The terminal device 16 of the user who performs the operation may be included or may not be included in the group.

Figure 25:
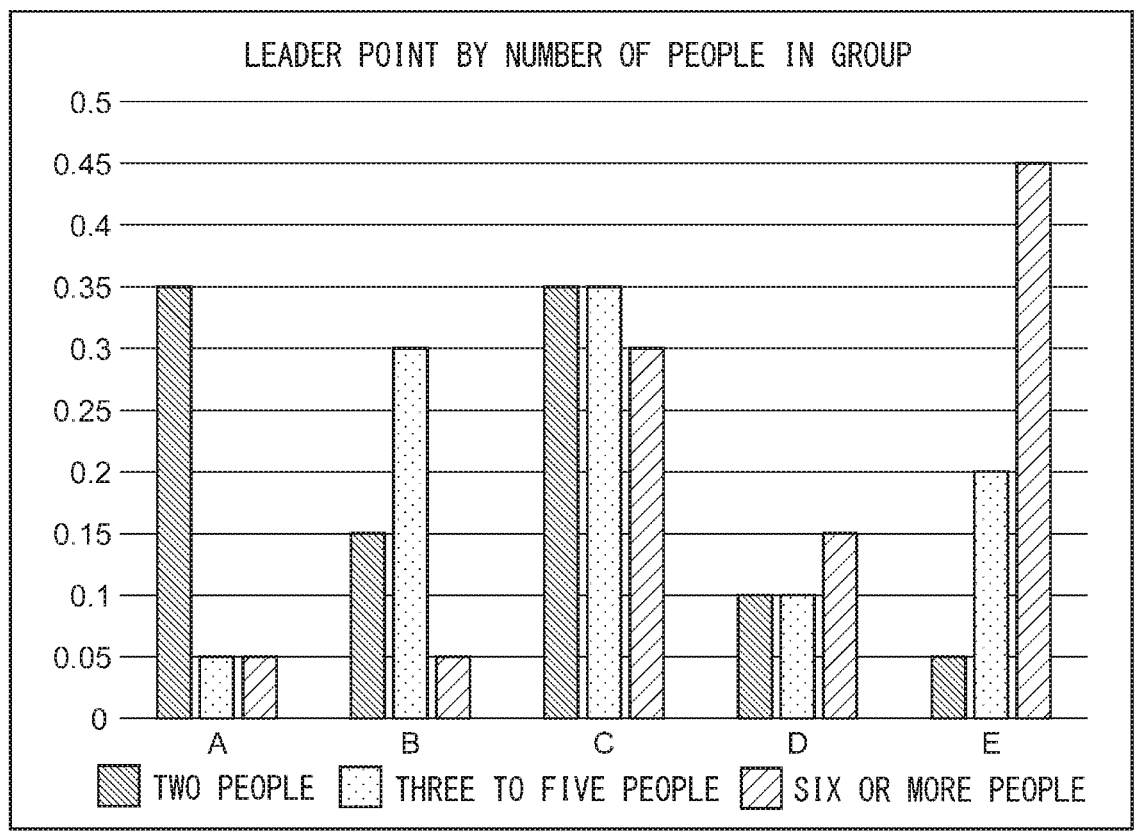
FIG. 25 is a diagram illustrating another screen displayed on the display according to the fifth embodiment.

FIG. 25 illustrates another screen displayed on the display 52 according to the fifth embodiment. This corresponds to an example of displaying leader points by the number of people in the group. The number of people in the group is displayed in three stages including "2 people", "3 to 5 people", and "6 or more people". It can be said that the leader points are displayed by category determined according to the number of people in the group. The leader points illustrated here are values obtained by calculating average values by the number of people in the group (by three categories), of the leader points obtained by each of the terminal devices 16 to be displayed for a predetermined period, and performing normalization such that a total value of the average values by the number of people in the group becomes "1", in the point calculator 42. For example, normalization is performed such that the total of the leader points of the first terminal device 16a to the fifth terminal device 16e corresponding to the number of people in the group "2" becomes "1". In the example illustrated here, it is found that the influence of the first terminal device 16a is large in a case where the number of people in the group is two (a few people) but the influence becomes small when the number of people in the group is increased. Meanwhile, as contrasted with the first terminal device 16a, it is found that the fifth terminal device 16e has large influence in a case where the number of people in the group is larger than or equal to six (a large number of people) but has small influence when the number of people in the group is decreased. Further, it is found that the third terminal device 16c exerts comparatively strong influence in any scene regardless of the number of people in the group.

Figure 26:
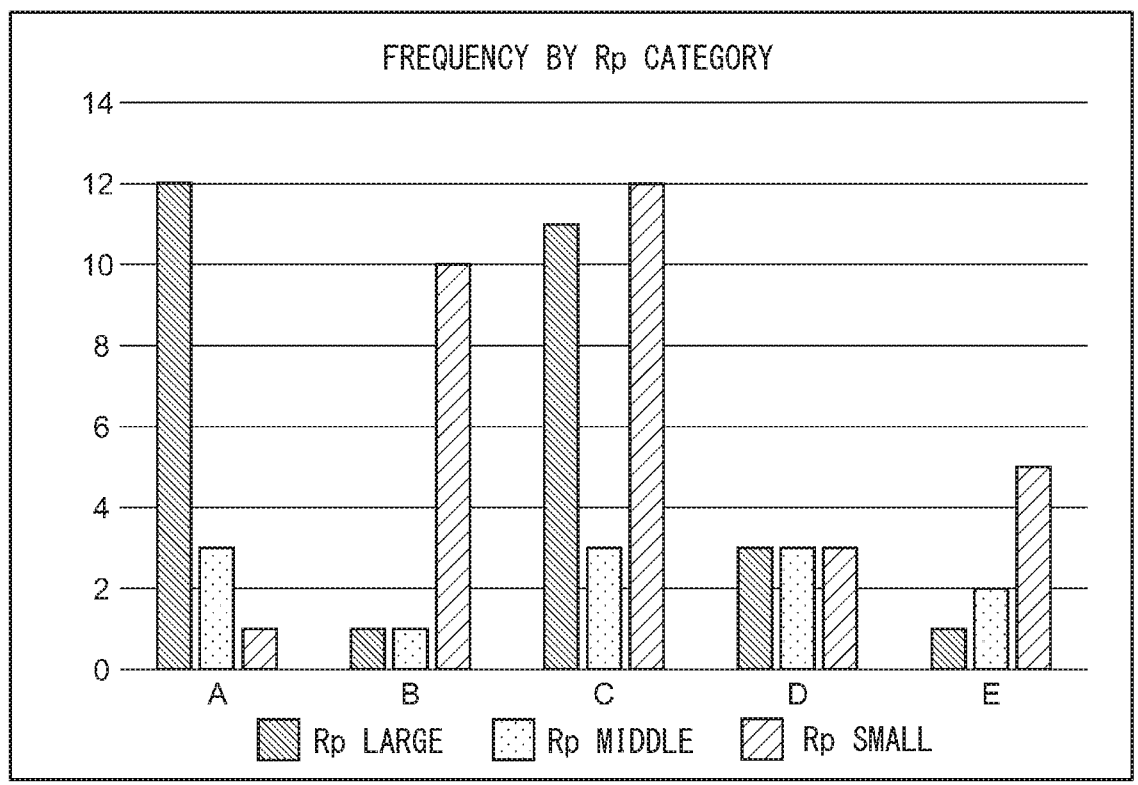
FIG. 26 is a diagram illustrating another screen displayed on the display according to the fifth embodiment.

FIG. 26 illustrates another screen displayed on the display 52 according to the fifth embodiment. This corresponds to an example in which the leader points obtained by the terminal devices 16 for a predetermined period are classified into a plurality of categories (leader point categories, described as Rp categories) on the basis of a predetermined rule, and the frequency for each category is displayed. For example, the point calculator 42 causes the value of the leader point (Rp) of "larger than or equal to 0.6" to correspond to a category "Rp large", "larger than or equal to 0.4 and less than 0.6" to correspond to a category "Rp middle", and "less than 0.4" to correspond to a category "Rp small". Here, the leader points are normalized. On the other hand, in a case where the leader points are not normalized, the point calculator 42 causes the value of the leader point (Rp) of "larger than or equal to 120" to correspond to the category "Rp large", "larger than or equal to 50 and less than 120" to correspond to the category "Rp middle", and "less than 50" to correspond to the category "Rp small".

Further, the point calculator 42 counts the number of data corresponding to each of the three categories for each terminal ID in the point storage 44. Of course, another number of categories may be used. Such a leader point category can also be said to be the index of an aggregation of the leader points. Note that, in a case where the number of people in the group is small, the condition of "Rp large" may be made severe (the threshold value corresponding to Rp large may be made large), and in a case where the number of people in the group is large, the condition of "Rp large" may be relaxed (the threshold value corresponding to Rp large may be made small).

The above-described predetermined rule is illustrated in FIG. 27, for example. FIG. 27 is a diagram illustrating a data structure of a database stored in the group information processor 24 according to the fifth embodiment. In this example, the leader point (Rp) of "larger than or equal to 0.8" corresponds to the category "Rp large", "larger than or equal to 0.4 and less than 0.8" corresponds to the category "Rp middle", and "less than 0.4" corresponds to the category "Rp small" in a case where the number of people is "two".

In FIG. 26, it can be seen that the first terminal device 16a has a high ratio of "Rp large" and exerts strong influence in many group actions. Meanwhile, it can be seen that the second terminal device 16b has a small ratio of "Rp large", and does not exert influence in almost all group actions. Further, the third terminal device 16c has many times of "Rp large". However, the number of times of "Rp small" is almost the same. Therefore, it is known that whether the third terminal device 16c exerts strong influence on influence is not fixed and on a case by case basis. Note that FIG. 26 illustrates the frequency (absolute frequency) for each category. However, a relative frequency that is normalized such that the total sum of the frequencies of a category of the users (terminal devices 16) becomes 1 may be used.

In the description so far, the information providing device 10 executes the calculation of the characteristic action amount and the leader point. However, other methods can also be used. For example, the terminal device 16 exchanges the position information with the terminal device 16 in the vicinity at any time, and forms a group, using its own position information and position information of the another terminal device 16. Further, the terminal device 16 may calculate the characteristic action amounts and the leader points for the terminal devices 16 included in the group. That is, the position information manager 22 and the group information processor 24 may be included in the terminal device 16. Each of the terminal devices 16 in the group may calculate only its own leader point or a specific terminal device 16 may collectively calculate the leader points of a plurality of terminal devices 16. Further, the terminal device 16 that has calculated the leader point transmits the leader point to the other terminal devices 16. Each of the terminal devices 16 in the group acquires the leader points corresponding to the plurality of terminal devices 16 by calculating the leader points by itself, receiving the leader points from other terminal devices 16, or combining the leader points calculated by itself and received from other terminal devices. The terminal device 16 causes the display 52 to perform display, using the leader points.

According to the present embodiment, the information indicating the estimated influence is provided to the user. Therefore, the user can objectively and quantitatively grasp the human relation (implicit role or the like) within the group. In addition, the human relation of the users in the group can be objectively and quantitatively grasped. Therefore, the user can easily improve his/her own behavior and review the interpersonal relation. In addition, the index of an aggregation of a plurality of leader points is calculated, and thus the estimation accuracy of the influence can be improved. Further, at least one of the total value, the representative value, the maximum value, the minimum value, the value indicating variation, of the leader points, the frequency of each category determined according to the magnitude of the leader point, and the relative frequency of the each category is calculated as the index. Therefore, the user can quantitatively grasp the influence. Further, the index is calculated for each purpose of group actions or for each genre of an item selected in the group. Therefore, the user can grasp the influence in more detail. Further, the user is allowed to freely select a combination of the terminal devices 16 (users) and the leader points are displayed in a comparable manner. Therefore, the user can easily grasp the influence.

Further, by providing the information indicating the influence of users in the group actions, the users know mutual influences that the users are not necessarily aware of, and the users can enjoy the information as a sort of entertainment information. For example, the information gives awareness such as "I thought Mr. A takes the leadership in the group but in fact Mr. B's influence is strong", and can stimulate the group's human relations. The information also helps to review the user's own position and role in the group. For example, the information gives awareness such as "I agree to everything other users in the group say and I am not demonstrating leadership. Let's proactively offer proposal." or "I understand that I take the leadership in the group. Let's get involved in the tastes of others next time". That is, information leading to improvement of the user's own behavior and improvement of the human relation in the group can be provided. Further, group formation and derivation of the leader points are executed by the terminal device, and thus the influence can be estimated only with the terminal device.

Sixth Embodiment

Next, a sixth embodiment will be described. The sixth embodiment relates to an information providing system including a plurality of terminal devices and an information providing device connectable to the terminal devices, similarly to the embodiments so far. Therefore, the information providing device according to the sixth embodiment forms a group, using position information of a plurality of terminal devices, and estimates influence of users in the group, similarly to the embodiments so far. The leader points have been calculated on the basis of the characteristic action of the user in one group action. However, in the sixth embodiment, leader points calculated in a past group action are reflected in leader points in a current group action. Specifically, a past leader point of another user is reflected in a leader point of a certain user (one user) in a group. An information providing system 100, a terminal device 16, and an information providing device 10 according to the sixth embodiment are of similar types to those in FIGS. 1, 13, 15, and 19. Here, differences will be mainly described.

A point calculator 42 in FIG. 15 or 19 similarly calculates a leader point as before. The information is stored in a group information processor 24. FIG. 28 illustrates a data structure of a database (group information table) stored in the group information processor 24 according to the fifth embodiment. In the following description, a group ID of a group to be processed (current group) is "G21". In the group information table, the group ID "G21" corresponds to three terminal devices 16 of "C", "D", and "E". The three terminal devices 16 correspond to a third terminal device 16c, a fourth terminal device 16d, and a fifth terminal device 16e. Furthermore, leader points (temporary points) at a certain point of time are "C=80", "D=100", and "E=60".

Further, a point history table, an example of which is illustrated in FIG. 23, is stored in a point storage 44 in a user information storage 28 in FIG. 15 or 19. The point history table is a table illustrating past leader points for each terminal ID, and is, for example, a table in which calculation date and time and the leader point are associated with each other.

Figure 29:
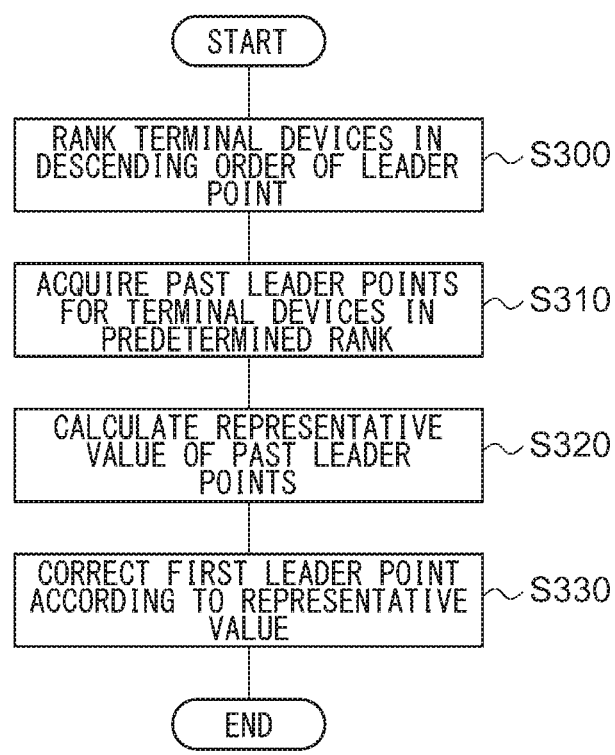
FIG. 29 is a flowchart illustrating a procedure of correcting a leader point by an information providing device according to the sixth embodiment.

In the present embodiment, the information providing device 10 executes step S115 (not shown) before executing step S120 after executing step S110. Detailed processing of step S115 will be described with reference to the flowchart of FIG. 29. First, in step S300, the point calculator 42 ranks the terminal devices 16 of the group to be processed in descending order of the leader points (temporary points). In the above example, "D=1st place", "C=2nd place", "E=3rd place".

Next, in step S310, the point calculator 42 acquires the past leader points for the terminal devices 16 in predetermined ranks. Here, the predetermined ranks are ranks from the second place to a certain rank (X rank) under the second place. More specifically, the point calculator 42 refers to the point history table stored in the point storage 44 for the second-place terminal device, and acquires the past leader points. In the above example, the past leader points of the third terminal device 16c are acquired. In the example of FIG. 23, the point calculator 42 acquires three data "(G11, C)=0.4", "(G12, C)=0.6", and "(G13, C)=0.8". The predetermined rank may be set to only the second place, where X is the second place. In a case where the predetermined ranks are "the second place and the third place", where X=3, the point calculator 42 further acquires the past leader points of the fifth terminal device 16e.

In the example of FIG. 23, two data "(G11, E)=0.05" and "(G12, E)=0.15" are acquired. Note that the point calculator 42 may acquire the past leader points, limiting the group IDs to group IDs not including the terminal device 16 in the first place. For example, the point calculator 42 acquires the past leader points, excluding the group ID including the fourth terminal device 16d, in acquiring the past leader points for the terminal device 16 in the second place. In the above example, since the fourth terminal device 16d is included in G11, the point calculator 42 may exclude G11 and acquire two data of "(G12, C)=0.6" and "(G13, C)=0.8". Similarly, the point calculator 42 acquires, for the terminal device 16 in the third place, the past leader points that does not include the terminal device 16 in the first place. In this way, by acquiring the past leader points, limiting data only to the data that does not include the terminal device 16 in the first place, the correction accuracy of the leader points to be described below may be improved in some cases.

Next, in step S320, the point calculator 42 calculates a representative value of the past leader points for each terminal device 16, using the acquired leader points. As the representative value, any one of an average value, a median, and a mode can be used. In the following description, the average value is used. In the above example, the average value of the third terminal device 16c is "(0.4+0.6+0.8)÷3=0.6". The average value of the fifth terminal device 16e is "(0.05+0.15)÷2=0.1".

Next, in step S330, the point calculator 42 determines whether the calculated representative value satisfies a predetermined condition, and corrects the leader point of the first place according to the determination result. More specifically, the point calculator 42 increases the leader point in the first place when the representative value satisfies a predetermined condition, where the predetermined condition is that the representative value is larger than or equal to a predetermined value θ1. For example, in the case of "θ1=0.3", the third terminal device 16c satisfies this condition in the above example, and thus the leader point "D=100" in the first place is multiplied by 1.5 to obtain "D=150", and "30" is added to obtain "D=130". That is, the point calculator 42 corrects the leader point by multiplying the leader point in the first place by a predetermined coefficient or by adding a predetermined number. In a case where a terminal device 16 (user) having a high past leader point exists for the terminal device 16 (user) in the second place or less, the influence of the terminal device 16 (user) in the first place having a higher leader point can be estimated to be very strong. That is, a person having a higher leader point than a person having a high leader point in the past can be estimated to be a person having very strong influence. Therefore, the point calculator 42 performs processing of making the leader point higher than usual.

Further, the point calculator 42 may perform processing of decreasing the leader point in the first place when the representative value satisfies a predetermined condition, where the predetermined condition is that the representative value is less than a predetermined value θ2. For example, in the case of "θ2=0.2", the fifth terminal device 16e satisfies this condition in the above example, and thus the leader point "D=100" in the first place is multiplied by 0.8 to obtain "D=80", and "10" is subtracted to obtain "D=90". In a case where a terminal device 16 (user) having a low past leader point exists for the terminal device 16 (user) in the second place or less, the influence of the terminal device 16 (user) in the first place in the current group is estimated to be too strong than an actual state because other users' influence is weak. Therefore, the point calculator 42 performs processing of making the leader point lower than usual.

Further, the point calculator 42 may change the extent to increase or decrease the leader point according to the number of the terminal devices 16 having the representative value that is larger than or equal to the predetermined value θ1. For example, the point calculator 42 may perform processing of increasing the leader point by "1.5 times" in a case where the number of terminal devices 16 having the representative value that is larger than or equal to 81 is one, "doubling" the leader point in the case of two, and "tripling" the leader point in the case of three. Further, the point calculator 42 may "double" the leader point in the case where the representative value of the terminal device 16 in the second place is larger than or equal to 81, increase the leader point by "1.5 times" in the case where the representative value of the terminal device 16 in the third place is larger than or equal to 81, and increase the leader point by "2×1.5=3 times" in the case where the representative values of both of the terminal devices 16 in the second and third places are larger than or equal to 81. That is, the point calculator 42 may change the extent to correct the leader point according to the rank of the terminal device 16 having the representative value that satisfies the predetermined condition.

Note that, in the above description, the leader point of the terminal device 16 in the first place has been corrected. However, the leader point of the terminal device 16 in the second place or in a lower place may be corrected by a similar method, in a case where the number of the terminal devices 16 included in the group is large. For example, the leader point of the terminal device 16 in the second place may be increased or decreased using the past leader point of the terminal device 16 in the third place. That is, the point calculator 42 calculates the leader point for one subject included in the group on the basis of the leader point calculated in the past corresponding to another subject included in the group.

According to the present embodiment, the leader point for one subject included in the group is calculated on the basis of the leader point calculated in the past corresponding to another subject included in the group. Therefore, the calculation accuracy can be improved. Further, the leader point of the group to be processed is corrected using the past leader points accumulated in the point history table. Therefore, the influence of the user can be further reflected in the leader point with accuracy.

The present invention has been described on the basis of the embodiments. It is to be understood by those skilled in the art that the embodiments are merely examples, and various modifications can be made to the combination of configuration elements and processing processes of the embodiments and that such modifications fall also within the scope of the present invention.

The first to sixth embodiments may be defined by the following items.

[Item 1-1]
An information providing device including:
a group forming unit that acquires position information of a subject that is a user or a terminal device, and forms a group including a plurality of subjects on the basis of time series data of the position information pertaining to the plurality of subjects;
a point calculator that calculates, on the basis of the characteristic action amount, a characteristic action amount indicating the degree of being matched with a predetermined action pattern in which influence of a subject in the group is high, for each of the plurality of subjects included in the group formed in the group forming unit on the basis of the time series data of the position information, and calculates a point for each of the subjects; and
an item selector that selects an item to be presented to the group such that a subject having a high point calculated in the point calculator is prioritized.

[Item 1-2]
The information providing device according to item 1-1, wherein the point calculator calculates, as the characteristic action amount, at least one of the number of times, a time, a moving distance, and a probability, of a moving pattern of a subject in the time series data of the position information being matched with the predetermined action pattern, and calculates the point such that a larger value is obtained as the characteristic action amount is larger.

[Item 1-3]
The information providing device according to item 1-1 or 1-2, wherein the predetermined action pattern in the point calculator is a pattern in which a subject is positioned in a predetermined rank from a head of the group with reference to a moving direction of the group.

[Item 1-4]
The information providing device according to item 1-3, wherein the point calculator calculates the point that becomes higher as the predetermined rank is higher.

[Item 1-5]
The information providing device according to any one of items 1-1 to 1-4, wherein the predetermined action pattern in the point calculator is a pattern in which a subject moves from a time of division in a moving direction after join in a case where the group is divided into a plurality of groups and the groups are joined.

[Item 1-6]
The information providing device according to item 1-5, wherein the point calculator calculates the point on the basis of the number of subjects included in a small group when the group is divided into a plurality of groups.

[Item 1-7]
The information providing device according to any one of items 1-1 to 1-6, wherein the predetermined action pattern in the point calculator is a pattern in which, in a case where a subject stops, another subject stops following the stop.

[Item 1-8]
The information providing device according to item 1-7, wherein the point calculator calculates the point on the basis of the number of the another subjects that stop following the stop.

[Item 1-9]
The information providing device according to any one of items 1-1 to 1-8, wherein the point calculator calculates the point according to attribute information of a user corresponding to a subject.

[Item 1-10]
The information providing device according to item 1-9, wherein the point calculator calculates the point on the basis of the number of items included in the attribute information of the user.

[Item 1-11]

The information providing device according to item 1-9, wherein the point calculator calculates the point according to a relationship between a date when processing is executed and the attribute information of the user.

[Item 1-12]

The information providing device according to any one of items 1-1 to 1-11, wherein the group forming unit changes a condition for forming the group according to attribute information of a user corresponding to a subject.

[Item 1-13]

The information providing device according to any one of items 1-1 to 1-12, wherein the group forming unit forms at least two sub groups by classifying the plurality of subjects included in the group into at least two sub groups, and the item selector selects an item to be presented to each of the sub groups such that a subject having a high point calculated in the point calculator is prioritized.

[Item 1-14]

The information providing device according to any one of items 1-1 to 1-13, wherein the point calculator calculates the point according to the number of subjects included in the group.

[Item 1-15]

The information providing device according to any one of items 1-1 to 1-14, wherein the point calculator calculates the point for one subject included in the group on the basis of a point calculated in the past corresponding to another subject included in the group.

[Item 1-16]

The information providing device according to any one of items 1-1 to 1-15, wherein the item selector (1) derives the degree of recommendation of each item in the group by registering, while weighting with the point of each of the subjects calculated in the point calculator, the degree of preference for an item or the degree of preference for item attribute in a user corresponding to each of the subjects, and (2) selects the item on the basis of the derived degree of recommendation of each item in the group.

[Item 1-17]

The information providing device according to any one of items 1-1 to 1-16, wherein the item selector specifies a predetermined number of subjects in descending order of the point calculated in the point calculator, and selects the item on the basis of the points of the specified subjects.

[Item 1-18]

A terminal device including:

an acquisition unit that acquires position information of a subject that is a user or the terminal device;

a transmitter that transmits time series data of the position information acquired in the acquisition unit to an information providing device;

a receiver that receives, from the information providing device, information regarding an item selected in the information providing device to which the time series data of the position information has been transmitted in the transmitter; and a display that displays the information regarding an item received in the receiver, wherein, in the information providing device, the information regarding an item received in the receiver is information generated by (1) forming a group including a plurality of subjects on the basis of the time series data of the position information pertaining to the plurality of subjects, (2) calculating a characteristic action amount indicating the degree of being matched with a predetermined action pattern in which influence of a subject in the group is high, for each of the plurality of subjects included in the formed group, on the basis of the time series data of the position information, and (3) selecting an item to be presented to the group such that a subject having a high calculated point is prioritized.

[Item 1-19]

An information providing method including the steps of:

acquiring position information of a subject that is a user or a terminal device, and forming a group including a plurality of subjects on the basis of time series data of the position information pertaining to the plurality of subjects;

calculating, on the basis of the characteristic action amount, a characteristic action amount indicating the degree of being matched with a predetermined action pattern in which influence of a subject in the group is high, for each of the plurality of subjects included in the formed group on the basis of the time series data of the position information, and calculating a point for each of the subjects; and selecting an item to be presented to the group such that a subject having a high calculated point is prioritized.

[Item 1-20]

A program for causing a computer to execute the steps of:

acquiring position information of a subject that is a user or a terminal device, and forming a group including a plurality of subjects on the basis of time series data of the position information pertaining to the plurality of subjects;

calculating, on the basis of the time series data of the position information, a characteristic action amount indicating the degree of being matched with a predetermined action pattern in which influence of a subject in the group is high, for each of the plurality of subjects included in the formed group, and calculating a point for each of the subjects on the basis of the characteristic action amount; and selecting an item to be presented to the group such that a subject having a high calculated point is prioritized.

[Item 2-1]

An information providing device including:

a group forming unit that acquires position information of a subject that is a user or a terminal device, and forms a group including a plurality of subjects on the basis of time series data of the position information pertaining to the plurality of subjects;

a point calculator that calculates, on the basis of the characteristic action amount, a characteristic action amount indicating the degree of being matched with a predetermined action pattern in which influence of a subject in the group is high, for each of the plurality of subjects included in the group formed in the group forming unit on the basis of the time series data of the position information, and calculates a point for each of the subjects; and a transmitter that transmits the point calculated in the point calculator or an index of an aggregation of the points.

[Item 2-2]

The information providing device according to item 2-1, wherein the point calculator calculates, as the characteristic action amount, at least one of the number of times, a time, a moving distance, and a probability, of a moving pattern of a subject in the time series data of the position information being matched with the predetermined action pattern, and calculates the point such that a larger value is obtained as the characteristic action amount is larger.

[Item 2-3]

The information providing device according to item 2-1 or 2-2, wherein the predetermined action pattern in the point calculator is a pattern in which a subject is positioned in a predetermined rank from a head of the group with reference to a moving direction of the group.

[Item 2-4]

The information providing device according to item 2-3, wherein the point calculator calculates the point that becomes higher as the predetermined rank is higher.

[Item 2-5]

The information providing device according to any one of items 2-1 to 2-4, wherein the predetermined action pattern in the point calculator is a pattern in which a subject moves from a time of division in a moving direction after join in a case where the group is divided into a plurality of groups and the groups are joined.

[Item 2-6]

The information providing device according to item 2-5, wherein the point calculator calculates the point on the basis of the number of subjects included in a small group when the group is divided into a plurality of groups.

[Item 2-7]

The information providing device according to any one of items 2-1 to 2-6, wherein the predetermined action pattern in the point calculator is a pattern in which, in a case where a subject stops, another subject stops following the stop.

[Item 2-8]

The information providing device according to item 2-7, wherein the point calculator calculates the point on the basis of the number of the another subjects that stop following the stop.

[Item 2-9]

The information providing device according to any one of items 2-1 to 2-8, wherein the point calculator calculates the point according to attribute information of a user corresponding to a subject.

[Item 2-10]

The information providing device according to item 2-9, wherein the point calculator calculates the point on the basis of the number of items included in the attribute information of the user.

[Item 2-11]

The information providing device according to item 2-9, wherein the point calculator calculates the point according to a relationship between a date when processing is executed and the attribute information of the user.

[Item 2-12]

The information providing device according to any one of items 2-1 to 2-11, wherein the group forming unit changes a condition for forming the group according to attribute information of a user corresponding to a subject.

[Item 2-13]

The information providing device according to any one of items 2-1 to 2-12, wherein the point calculator calculates the point according to the number of subjects included in the group.

[Item 2-14]

The information providing device according to any one of items 2-1 to 2-13, wherein the point calculator calculates the point for one subject included in the group on the basis of a point calculated in the past corresponding to another subject included in the group.

[Item 2-15]

The information providing device according to any one of items 2-1 to 2-14, further including:

a point storage that stores the point calculated in the past in the point calculator in association with each of the subjects, wherein the point calculator calculates the index of an aggregation of a plurality of the points corresponding to one subject while referring to the point storage.

[Item 2-16]

The information providing device according to item 2-15, wherein the point calculator calculates, as the index, at least one of a total value, a representative value, a maximum value, a minimum value, a value indicating variation, of the points, a frequency of each category determined according to the magnitude of the point, and a relative frequency of the each category.

[Item 2-17]

The information providing device according to item 2-15 or 2-16, wherein the point calculator calculates the index by purpose of an action of the group, by genre of an item selected by the group, or by the number of members of the group.

[Item 2-18]

A terminal device capable of communicating with the information providing device according to item 2-1, the terminal device including:

a transmitter that transmits its own position information to the information providing device;

a receiver that receives the point or the index of an aggregation of the points from the information providing device; and a controller that performs control for causing a display to display the received data.

[Item 2-19]

A terminal device capable of communicating with another terminal device, the terminal device including:

an acquisition unit that acquires position information of the another terminal device;

a group forming unit that forms a group including a plurality of terminal device on the basis of time series data of the acquired position information of the another terminal device and position information of the terminal device;

a point calculator that calculates, for at least one terminal device included in the group formed in the group forming unit, a characteristic action amount indicating the degree of being matched with a predetermined action pattern in which influence of a user corresponding to the terminal device in the group is high, on the basis of the time series data, and calculates a point on the basis of the characteristic action amount; and a controller that performs control for causing a display to display the point calculated in the point calculator or an index of an aggregation of the points.

[Item 2-20]

An information providing method including the steps of:

acquiring position information of a subject that is a user or a terminal device, and forming a group including a plurality of subjects on the basis of time series data of the position information pertaining to the plurality of subjects;

calculating, on the basis of the time series data of the position information, a characteristic action amount indicating the degree of being matched with a predetermined action pattern in which influence of a subject in the group is high, for each of the plurality of subjects included in the formed group, and calculating a point for each of the subjects on the basis of the characteristic action amount; and transmitting the calculated point or an index of an aggregation of the points.

[Item 2-21]

A program for causing a computer to execute the steps of:

acquiring position information of a subject that is a user or a terminal device, and forming a group including a plurality of subjects on the basis of time series data of the position information pertaining to the plurality of subjects;

calculating, on the basis of the time series data of the position information, a characteristic action amount indicating the degree of being matched with a predetermined action pattern in which influence of a subject in the group is high, for each of the plurality of subjects included in the formed group, and calculating a point for each of the subjects on the basis of the characteristic action amount; and transmitting the calculated point or an index of an aggregation of the points.

What is claimed is:

1. An information providing device comprising:
   a group forming unit that:
   acquires time series data of position information, the time series data being data that maps a position of a subject that is a user or a terminal device in a physical space to a point of time and indicating change in the position of each of a plurality of subjects in the physical space,
   calculates a distance between a plurality of subjects in the physical space on a basis of the time series data of the position information, and
   forms a group including the plurality of subjects as members when the plurality of subjects are positioned for a predetermined time or longer and within a predetermined distance;
   a point calculator that determines on the basis of the time series data of the position information, whether a relationship between a temporal change in a position of an arbitrary one member belonging to the group and a temporal change in a position of another member matches any of a plurality of types of patterns of change regarding positions in the physical space, and when it is determined that a match is found, calculates a point for each member in the group by adding a characteristic action amount defined according to a type, for which a match is found, to a point of the one member; and
   a transmitter that transmits information regarding the point calculated in the point calculator or information regarding an item selected on the basis of the point,
   wherein the group forming unit, the point calculator, and the transmitter are hardware or a combination of hardware and software.

2. The information providing device according to claim 1, further comprising:
   an item selector that:
   calculates, in order to select an item, the degree of recommendation of each item for the group by calculating a sum of values derived from multiplying a point member of the group by the degree of preference of each member for an item or the degree of preference of each of the subjects for an item attribute, wherein a larger a value of the point calculated in the point calculator, the more favored a preference of the member, and
   selects an item for the group on the basis of the calculated the degree of recommendation,
   wherein the transmitter transmits information for displaying, on a display of the terminal device, a name of the item selected in the item selector.

3. The information providing device according to claim 1, wherein one of the plurality of types of patterns of change in the point calculator is a pattern in which the one member moves at a position of a predetermined rank with reference to a moving direction of the group in the physical space, and the larger the number of times that the one member is positioned at the predetermined rank counted from the head of the group, the larger the value of the point of the one member is used.

4. The information providing device according to claim 3, wherein the point calculator calculates the point, wherein the closer the rank of the one member, counted from the head of the group in the physical space, to the head, the larger the value of the characteristic action amount is used.

5. The information providing device according to claim 3, wherein the smaller the number of members in the group formed by the group forming unit, the more strictly the point calculator limits the predetermined rank to a rank close to the head of the group in the physical space is used.

6. The information providing device according to claim 1, wherein one of the plurality of types of patterns of change in the point calculator is a pattern in which, when the group is divided into a plurality of small groups in the physical space and then the small groups are joined, the one member moves from a time of division in a direction in which the group moves after being joined, the larger the number of times of being joined, the larger the value of the point of the one member is used.

7. The information providing device according to claim 6, wherein the point calculator calculates the point, wherein the larger the number of members in a joining small group, of the plurality of small groups in the physical space, that does not include the one member, the larger the value of the characteristic action amount is used.

8. The information providing device according to claim 6, wherein the smaller the number of members in a small group, of the plurality of small groups in the physical space, that includes the one member and that is joined, the larger the value of the characteristic action amount used by the point calculator is used.

9. The information providing device according to claim 1, wherein one of the plurality of types of patterns of change regarding position information in the point calculator is a pattern in which, in a case where the one member comes to a stop in the physical space, another member also stops following the stop, and the larger the number of times of stop, the larger the value of the point of the one member is used.

10. The information providing device according to claim 9, wherein the larger the number of members that stop following the stop of the one member, or, of the members of the group, the larger a proportion of members that stop, the larger the value of the characteristic action amount used by the point calculator is used.

11. The information providing device according to claim 1, wherein the point calculator calculates the point to obtain a larger value than usual by multiplying an added value of the characteristic action amounts by a coefficient of a value larger than 1, in a case where the number of members included in the group is larger than or equal to a predetermined number.

12. The information providing device according to claim 1, wherein the point calculator calculates the point of the one member on the basis of a point calculated when another member included in the group belonged to another group in the past.

13. The information providing device according to claim 1, wherein the point calculator calculates an index that is an aggregation, for each member of the group, of a plurality of the points calculated in a plurality of times of group actions in the physical space, and
   the information regarding the point transmitted in the transmitter is information for displaying the index for each member on a display of the terminal device.

14. The information providing device according to claim 13, wherein the point calculator calculates, for each member of the group, a value of any of a total value, an average value, a median, a mode, a maximum value, a minimum value, a value indicating variation, of the plurality of points calculated in the plurality of times of group actions, and sets the calculated value to the index in the physical space.

15. The information providing device according to claim 13, wherein the point calculator calculates the index by aggregating, for each of combinations of a plurality categories corresponding to purpose of group action and the members of the group, a plurality of the points calculated in a plurality of times of group actions in the physical space by category based on a purpose of the group action.

16. The information providing device according to claim 13, wherein the point calculator calculates index by aggregating, for each of combinations of a plurality of categories corresponding to the number of members in the group and the members of the group, a plurality of the points calculated in a plurality of times of group actions in the physical space.

17. The information providing device according to claim 13, wherein the point calculator uses three categories determined according to the magnitude of the point to:
    associate the point equal to larger than a first threshold value with a first category, associate the point in a range smaller than the first threshold value and larger than or equal to a second threshold value with a second category, and associate the point smaller than the second threshold value with a third category; and
    calculate the index by aggregating, for each of combinations of the three categories and the members of the group, the plurality of the points calculated in the plurality of times of group actions.

18. The information providing device according to claim 1,
    wherein the item selected by the group is a store that exits in the physical space,
    when the position of each member of the group in the physical space does not change for a predetermined time or longer, the point calculator determines that the group selects the item, and
    when the point calculator determines that the group selects the item, the transmitter stops transmitting the information.

19. An information providing method executed by a processor or a computing system, the method comprising the steps of:
    acquiring time series data of position information, the time series data being data that maps a position of a subject that is a user or a terminal device in a physical space to a point of time and indicating change in the position of each of a plurality of subjects in the physical space;
    calculating a distance between a plurality of subjects in the physical space on the basis of the time series data of the position information;
    forming a group including the plurality of subjects as members when the plurality of subjects are positioned for a predetermined time or longer and within a predetermined distance;
    determining, on the basis of the time series data of the position information, whether a relationship between a temporal change in a position of an arbitrary one member belonging to the group and a temporal change in a position of another member matches any of a plurality of types of patterns of change regarding positions in the physical space;
    when it is determined that a match is found, calculating a point for each member in the group by adding a characteristic action amount defined according to a type, for which match is found, to a point of the one member; and
    transmitting information regarding the point calculated in the point calculator or information regarding an item selected on the basis of the point.

20. A computer-readable storage medium storing an information providing program for executing a computer to execute the steps of:
    acquiring time series data of position information, the time series data being data that maps a position of a subject that is a user or a terminal device in a physical space to a point of time and indicating change in the position of each of a plurality of subjects in the physical space, calculating a distance between a plurality of subjects in the physical space on the basis of the time series data of the position information, and forming a group including the plurality of subjects as members when the plurality of subjects are positioned for a predetermined time or longer and within a predetermined distance;
    determining, on the basis of the time series data of the position information, whether a relationship between a temporal change in a position of an arbitrary one member belonging to the group and a temporal change in a position of another member matches any of a plurality of types of patterns of change regarding positions in the physical space, and,
    when it is determined that a match is found, calculating a point for each member in the group by adding a characteristic action amount defined according to a type, for which match is found, to a point of the one member; and
    transmitting information regarding the point calculated in the point calculator or information regarding an item selected on the basis of the point.

* * * * *